United States Patent
Taylor

(10) Patent No.: US 7,219,952 B2
(45) Date of Patent: *May 22, 2007

(54) STRUCTURALLY INDEPENDENT LOAD BEARING SUPPORT SYSTEM

(75) Inventor: William Taylor, Linden, NJ (US)

(73) Assignee: JDM Venture, LLC, Belle Harbor, NY (US)

( * ) Notice: Subject to any disclaimer, the term of this patent is extended or adjusted under 35 U.S.C. 154(b) by 4 days.

This patent is subject to a terminal disclaimer.

(21) Appl. No.: 10/956,654

(22) Filed: Oct. 1, 2004

(65) Prior Publication Data

US 2006/0033351 A1    Feb. 16, 2006

Related U.S. Application Data

(60) Provisional application No. 60/601,514, filed on Aug. 13, 2004.

(51) Int. Cl.
B62D 33/00    (2006.01)

(52) U.S. Cl. .................. 296/182.1; 296/181.1

(58) Field of Classification Search ............ 296/182.1, 296/183.1, 186.2, 26.02, 26.03, 3, 36, 43, 296/181.1
See application file for complete search history.

(56) References Cited

U.S. PATENT DOCUMENTS

| | | | |
|---|---|---|---|
| 655,767 A * | 8/1900 | Douglas ................... 296/43 |
| 1,717,184 A * | 6/1929 | Browne ..................... 296/36 |
| 2,058,117 A * | 10/1936 | Wendel et al. ......... 296/203.01 |
| 2,489,670 A | 11/1949 | Powell, Jr. |
| 2,585,976 A | 2/1952 | Teeter |
| 2,720,414 A * | 10/1955 | Hart .............................. 296/3 |
| 2,812,973 A | 11/1957 | Pritchard |
| 2,901,283 A | 8/1959 | Curell |
| 3,091,493 A * | 5/1963 | Rivers .................... 296/182.1 |
| 3,589,768 A | 6/1971 | Wilson |
| 3,767,253 A | 10/1973 | Kluetsch |
| 3,957,159 A | 5/1976 | Radek |
| 4,405,170 A | 9/1983 | Raya |
| 4,889,377 A | 12/1989 | Hughes |
| 4,971,234 A | 11/1990 | Hay |
| 5,076,630 A | 12/1991 | Henriquez |
| 5,108,141 A * | 4/1992 | Anderson ..................... 296/3 |
| 5,143,416 A | 9/1992 | Karapetian |
| 5,150,484 A | 9/1992 | Whitten, Jr. |
| 5,152,570 A * | 10/1992 | Hood ............................ 296/3 |
| 5,273,337 A | 12/1993 | Herrmeyer |
| 5,476,301 A | 12/1995 | Berkich |
| 5,483,707 A | 1/1996 | Meyer et al. |
| 5,634,681 A * | 6/1997 | Gionta ........................ 296/3 |
| 5,810,314 A * | 9/1998 | Raziano .................... 248/371 |
| 5,941,667 A | 8/1999 | Hardison |
| 6,189,945 B1 | 2/2001 | Rockett |
| 6,220,463 B1 * | 4/2001 | Pullen ....................... 211/186 |
| 6,292,959 B1 | 9/2001 | Rosenquist |
| 6,347,731 B1 * | 2/2002 | Burger ....................... 224/405 |

(Continued)

Primary Examiner—Lori L. Lyjak
(74) Attorney, Agent, or Firm—Fulbright & Jaworski LLP

(57) ABSTRACT

A structurally independent load bearing support system for use in a cargo vehicle and supporting one or more levels of accessories to provide one or more additional levels of load bearing surfaces in addition to the floor of the cargo vehicle. The structurally independent load bearing support system comprises at least two side frames comprising a plurality of longitudinally spaced vertical members and at least one transverse member connecting the two side frames.

114 Claims, 16 Drawing Sheets

U.S. PATENT DOCUMENTS 6,752,301 B1 6/2004 Drolet
2002/0163214 A1 11/2002 Carter
2003/0127482 A1* 7/2003 Gort .......................... 224/549
2005/0211140 A1* 9/2005 McDonald et al. ......... 108/108

* cited by examiner

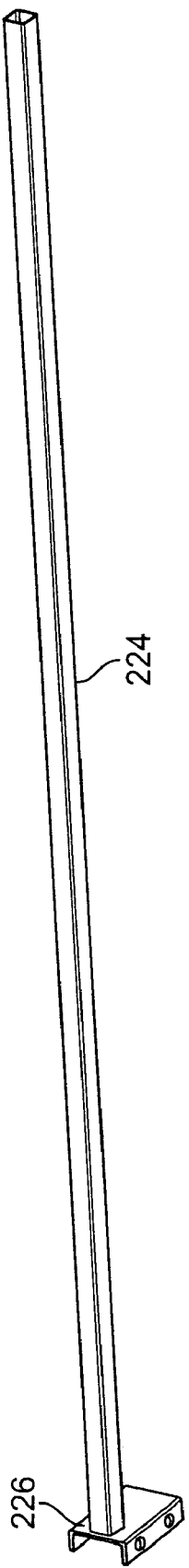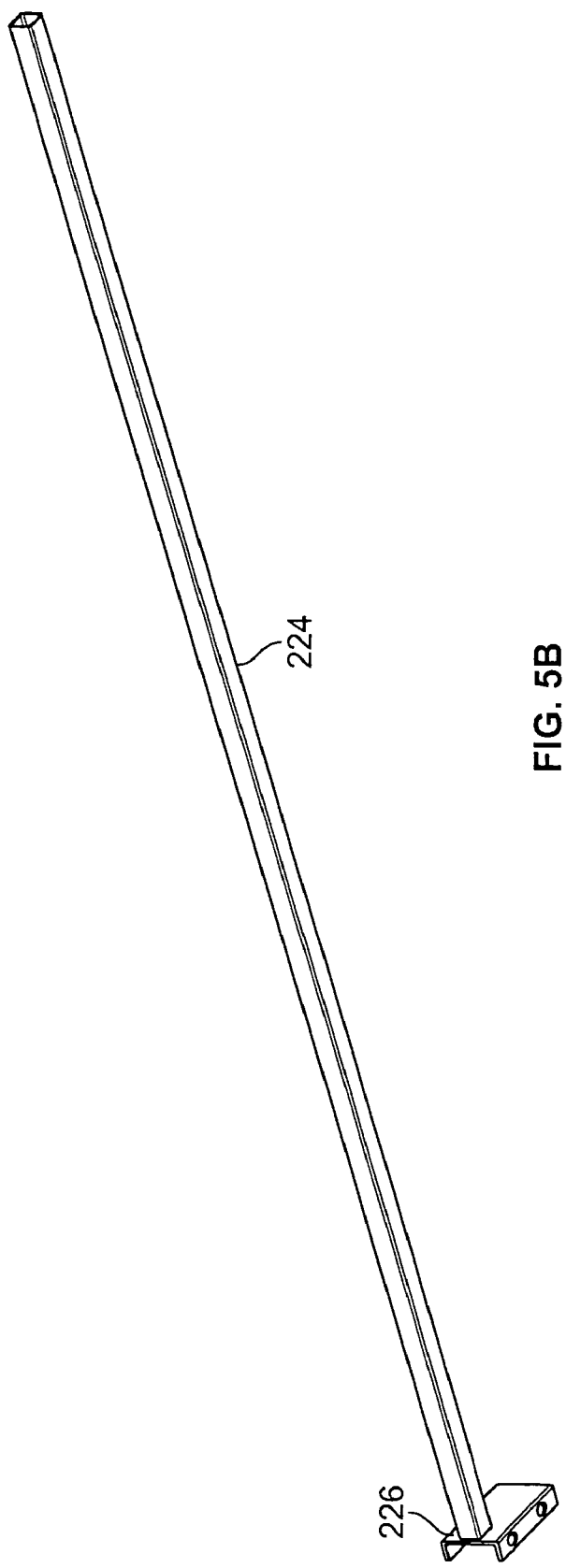
FIG. 5A
FIG. 5B

STRUCTURALLY INDEPENDENT LOAD BEARING SUPPORT SYSTEM

RELATED APPLICATION(S)

This application claims priority benefit under Title 35 U.S.C. § 119(e) of provisional application No. 60/601,514, filed Aug. 13, 2004, which is incorporated by reference in its entirety.

BACKGROUND OF THE INVENTION

The present invention relates generally to a support system, more particularly, to a structurally independent load bearing support system for use in vehicles and supporting various assortments of accessories.

Although a large variety of box truck designs exist, they all include the common features of large interior space defined by the sidewalls, front and back walls, a roof, and a floor. The steel truck mainframe supports the flooring, which can include a wooden or metal platform secured to the main frame. The floor is normally bowed from front to rear in order to compensate for and provide some flexibility for heavy loads carried within the cargo area. The sidewalls and roof usually comprise material with little load bearing capability, such as fiberglass, plywood, thin sheet metal, fiberglass reinforced plywood, etc. The primary cargo load bearing structure for trucks of this type include the flooring and main frame. Typically, metal steel or aluminum bars mount at the box corners and along the edges of the box for the purpose of transferring carrying forces outward and downward to the main frame. Also, the sidewalls have been corrugated with vertically extending channels, or a portion of the sidewall may be fitted with a series of longitudinally spaced vertically extending channel members riveted to the inside or outside of the side walls, in an attempt to strengthen the sidewalls. However, these measures are generally ineffective in strengthening the sidewalls for carrying loads.

The box trucks have great utility, particularly for delivery companies that pickup, haul, and deliver a number and variety of packages of varying sizes, shapes, and weight. Currently, the shelving system is individually built and customized for a particular box truck. There is currently no standardized shelving system that can be easily and quickly assembled to fit these box trucks wherein various features and dimensions of the cargo area is non-uniform, e.g., due to bowed floors, wheeled wells, windows, doors, refrigeration units, fuel port covers, and other barriers etc. Additionally, the present shelving system is bolted or riveted to sidewalls of the box trucks which are designed to carry minimal load. This has an added disadvantage of potentially leaving unsightly rivets and/or damaging the outer surface of the sidewalls, including any logo thereon. Typically, an elongated piano hinge assembly having one stationary horizontal bar part is bolted or riveted to the inside surface of the sidewalls. Metal shelving connects to the other, or rotating part, of the hinge assembly. The shelving rotates between a storage position and an utility position. However, such a shelving system requires sidewalls, which are designed to carry a minimal load, to support the weight of the shelving system and the packages thereon. It is only a matter of time before the sidewalls of the box truck are damaged from static and dynamic loads of the shelving system as well as the vibrations imparted to the connection points where the hinge assembly is bolted or riveted to the sidewalls or their reinforcements. Additionally, the permanent fixture of the piano hinge assembly to the sidewalls of the box truck prevents any adjustments to the shelves after installation.

Accordingly, the present invention proceeds upon the desirability of providing a structurally independent load bearing support system for use in the box trucks and other cargo vehicles which does not transfer the weight of the support system and the cargo to the sidewalls of the box truck. The structurally independent load bearing support system of the present invention provides one or more levels of accessories, such as shelves, hooks, racks, platforms, bins, drawers, cots, hangars, benches and the like within and/or outside the cargo area of the vehicle. Preferably, accessories can be easily and reliably rotated to their stored and utility positions. Also, the accessories are removably attachable so that they can be easily and efficiently reconfigured to meet a particular cargo or storage need. For example, one or more shelves can be moved up or down to accommodate varying sized packages.

SUMMARY OF THE INVENTION

Therefore, it is an object of the present invention to provide a structurally independent load bearing support system that overcomes the aforementioned shortcomings of the present shelving system.

Another object of the present invention is to provide the structurally independent load bearing support system as aforesaid, which transfers its weight and the weight of the cargo/packages as well as the dynamic forces described herein to the load bearing elements of the cargo vehicle, such as the floor and mainframe of the box truck.

A further object of the present invention is to provide the structurally independent load bearing support system as aforesaid, which utilizes substantially all of the cargo space of the vehicle, both vertically and horizontally.

Yet another object of the present invention is to provide the structurally independent load bearing support system as aforesaid, which provides one or more levels of load bearing surfaces. The additional levels of load bearing surfaces can be benches, cots, shelves, platforms, and the like.

Still another object of the present invention is to provide the structurally independent load bearing support system as aforesaid, which provides a plurality of independently rotatable shelves selectively rotating between stored and utility positions.

The upstanding vertical member of the structurally independent load bearing support system of the present invention can be easily assembled outside of the cargo area and installed within the box truck as a unit. Once installed, the accessories, such as shelves, platforms, benches, cots, bins, drawers, hangars, racks, hooks, etc., can be easily attached to the vertical upright members as more fully described herein. This procedure reduces the amount of time and labor needed to complete the installation.

An embodiment of the structurally independent load bearing support system of the present invention comprises a series of longitudinally spaced load bearing vertical members formed into at least two opposing side frames. The vertical members of the respective opposing side frames are connected by one or more stabilization bar members to provide stability and alignment. Each side frame is supported directly by the cargo area floor and each side frame can be mounted flush with the respective walls of the cargo area. In the alternative, each side frame can be spaced closer together with respect to one another, and spaced further away from the respective walls of the cargo area. This configuration allows accessories, such as shelves, platforms, benches, cots, bins, drawers, hangars, racks, hooks, etc., to be easily attached on the vertical member on the side of each side frame which faces the cargo wall, as well as on the vertical member on the side of each side frame which faces the respective opposing side frame. Although not required, the side frames can be mounted to the floor of the cargo area to provide additional stability. Transverse members extending across the cargo area couple directly or indirectly to the top portions of the opposing vertical members in the respective opposing side frames. Thus, none of the side walls bear any dynamic or static load.

In accordance with an embodiment of the present invention, the structurally independent load bearing support system as aforesaid, comprises a number of brackets for connecting and supporting multiple levels of accessories, such as shelves, platforms, benches, bins, drawers, racks, hangars, hooks, etc. One end of the bracket forms a pair of opposed ears that fit on either side of the vertical member channel or rib. The upper part of the ears pivot about the axis of a longitudinal bolt or pin held in the vertical member. In the down or utility position, the bracket abuts the channel or rib inboard face. The bracket can rotate upward about the through bolt to the storage position where it can be held safely by a suitable device in the storage position. One shelf section preferably spans and connects to at least two brackets. A series of vertically spaced holes in the vertical member and through bolts can be provided to enable vertical adjustment and mounting of the various shelves simply by removing and repositioning the through bolt to a different vertical member through hole.

An embodiment of the present invention comprises a structurally independent load bearing support system for use in a cargo vehicle manufactured by a process. This process comprises the step of assembling at least two side frames, which include two or more longitudinally spaced vertical members. Each vertical member is connected to another vertical member within each respective side frame by one or more stabilization bar members. The stabilization bars provide stability and alignment of the longitudinally spaced vertical members. Additionally, the process comprises the step of connecting the opposing vertical members in the respective opposing side frames by at least one transverse member to form a structurally independent load bearing support system for supporting one or more levels of accessories. Thereby, the structurally independent load bearing support system provides one or more additional levels of load bearing surfaces for the cargo vehicle.

An embodiment of the structurally independent load bearing support system of the present invention comprises a kit for building a structurally independent load bearing support system for use in a cargo vehicle. The kit comprises one or more load bearing vertical members for forming at least two opposing side frames; one or more stabilization bar members for connecting the vertical members of each respective side frame; and at least one transverse member for connecting the opposing vertical members in the respective opposing side frames to form a structurally independent load bearing support system for supporting one or more levels of accessories. Thereby, the structurally independent load bearing support system provides one or more additional levels of load bearing surfaces. The kit can comprise members of the support system which are manufactured in a predetermined size and cut accordingly to fit various features and dimensions of the cargo vehicle. Alternatively, the kit can comprise members that are manufactured in a number of predetermined sizes to fit the various features and dimensions of the cargo vehicle. The kit also comprises instructions for building a structurally independent load bearing support system.

In accordance with an embodiment of the present invention, the structurally independent load bearing support system of the present invention as aforesaid, further comprises a plurality of open bins as the accessories. This embodiment of the invention allows a cargo vehicle, cargo box, or shed, and the like, to become a showroom to display products to customers.

An embodiment of the structurally independent load bearing support system of the present invention comprises a side frame with at least one cross brace form of at least two stabilization bar members. The ends of the each stabilization bar member can be attached to different vertical members within the same side frame. Additionally, the stabilization bar members can be attached to each other where they cross, or to another vertical member, or to both.

In accordance with an aspect of the present invention, the cross brace can be formed from at least two transverse members. Each transverse member can be attached to the stabilization bar member or to top of the vertical member of the structurally independent load bearing support system. Each end of the respective cross brace can be attached to a different vertical member or to a different stabilization bar member. The transverse members can be constructed and attached in a way to facilitate expansion and contraction of the present invention. The attached cross brace provides added stability and facilitates the load bearing aspect of the present invention.

Various other objects, advantages and features of the present invention will become readily apparent from the ensuing detailed description, and the novel features will be particularly pointed out in the appended claims.

DETAILED DESCRIPTION OF THE DRAWINGS

The following detailed description, given by way of example, and not intended to limit the present invention solely thereto, will best be understood in conjunction with the accompanying drawings in which.

Figure 4:
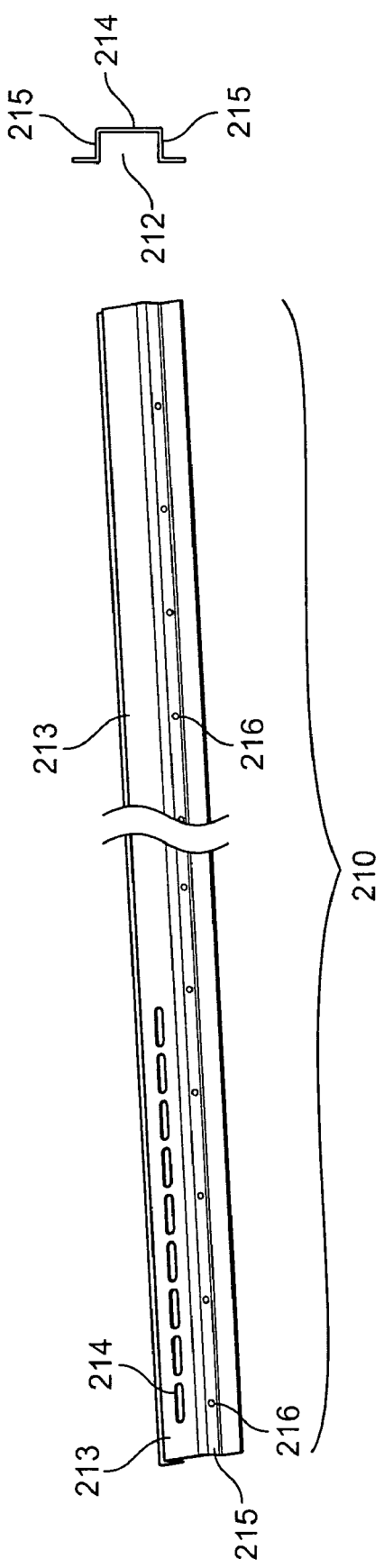
Figure 6:
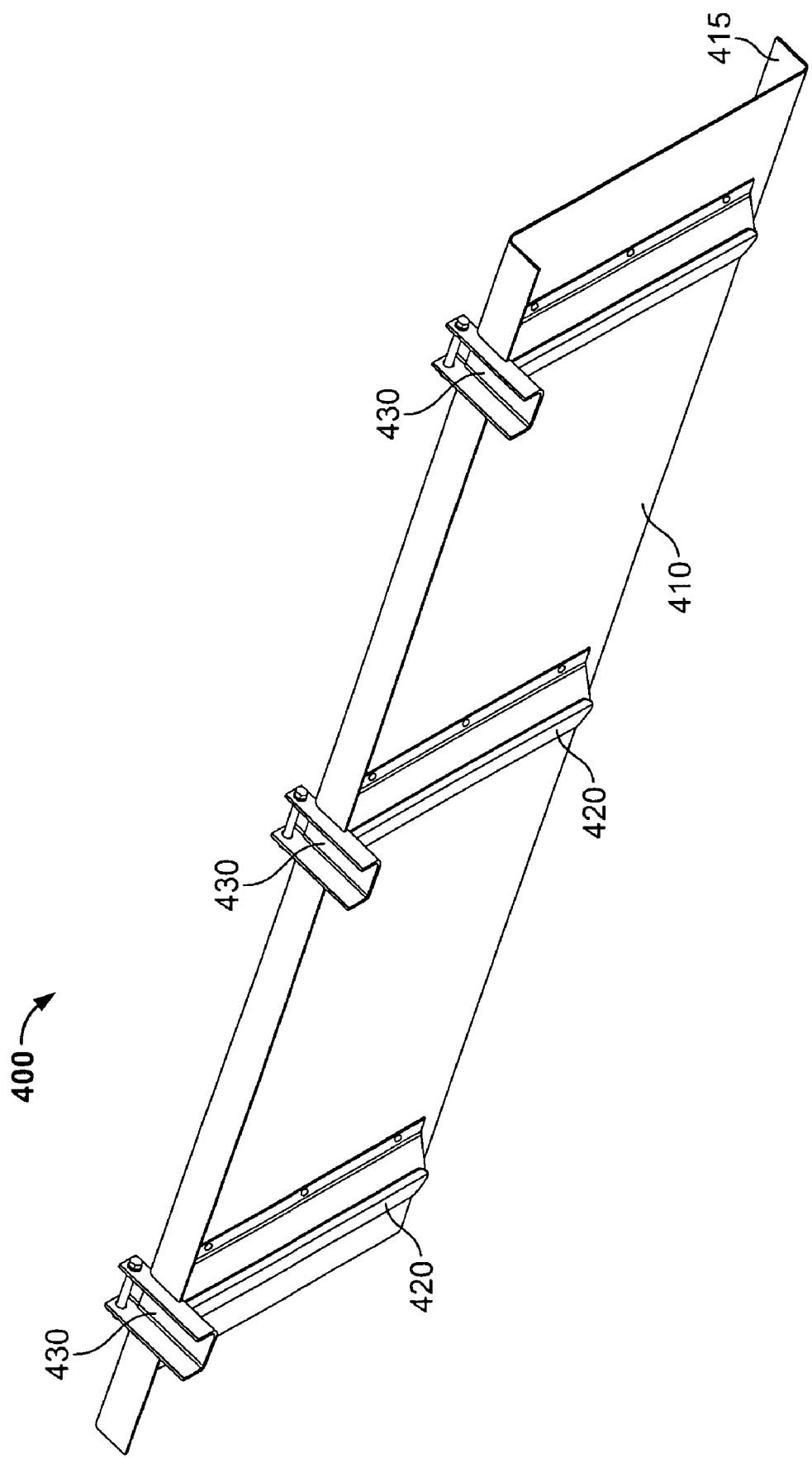
Figure 7A:
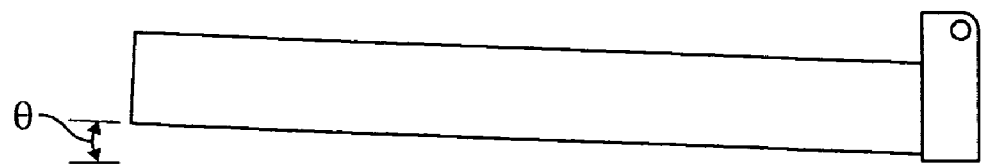
Figure 7B:
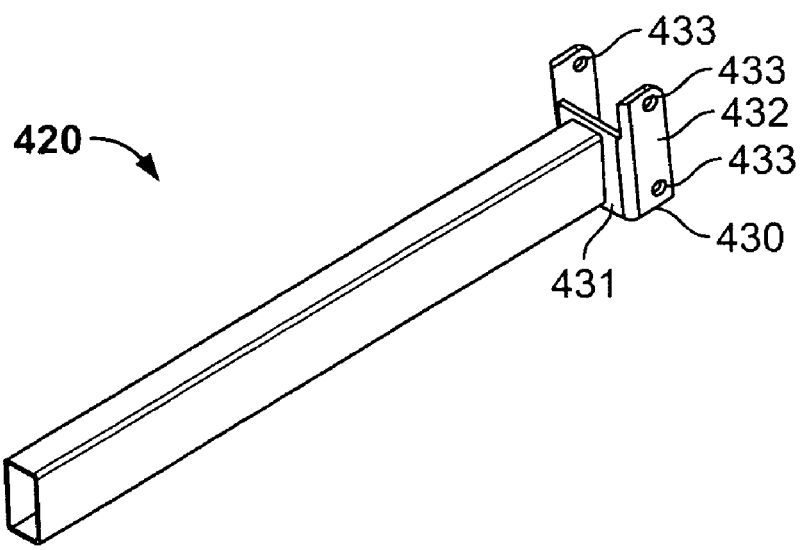
Figure 8:
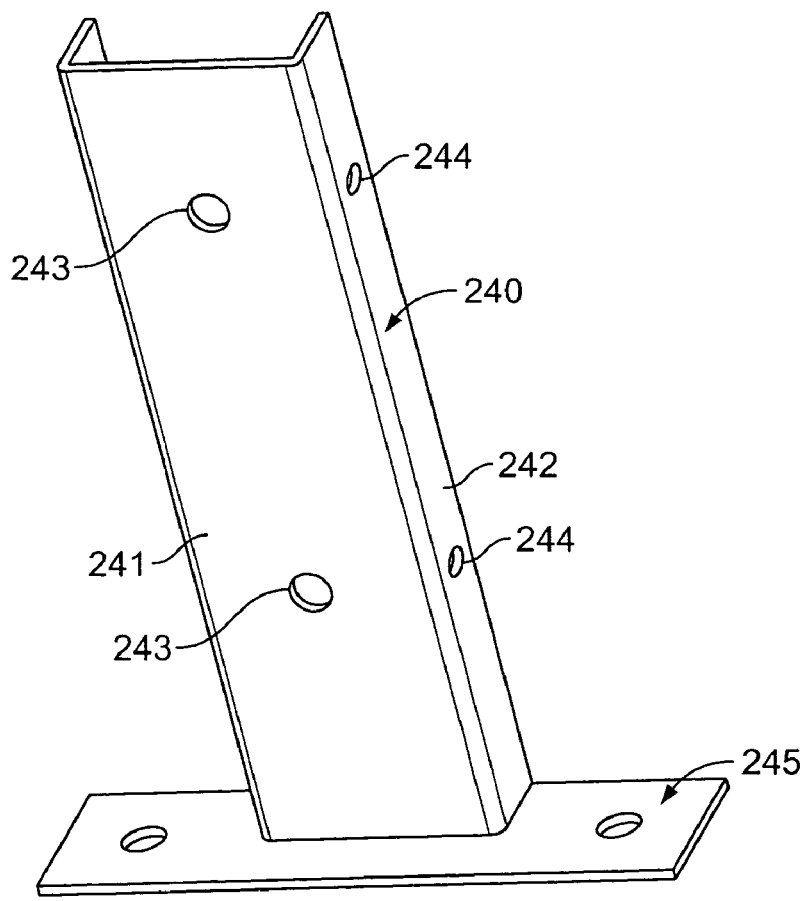
Figure 9:
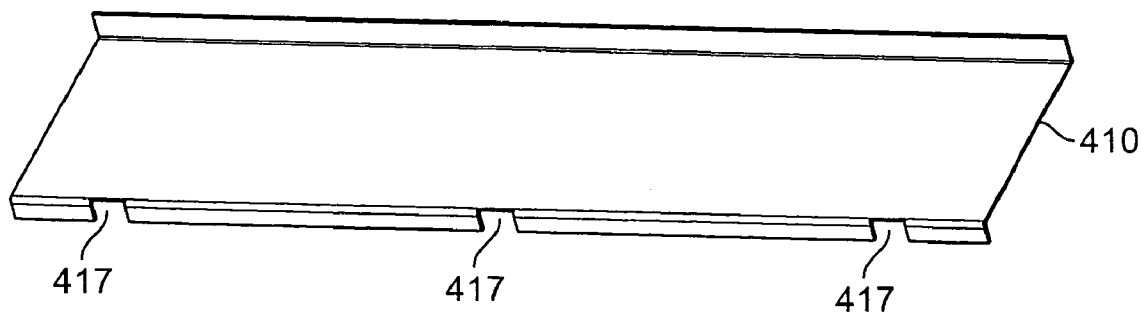
Figure 10:
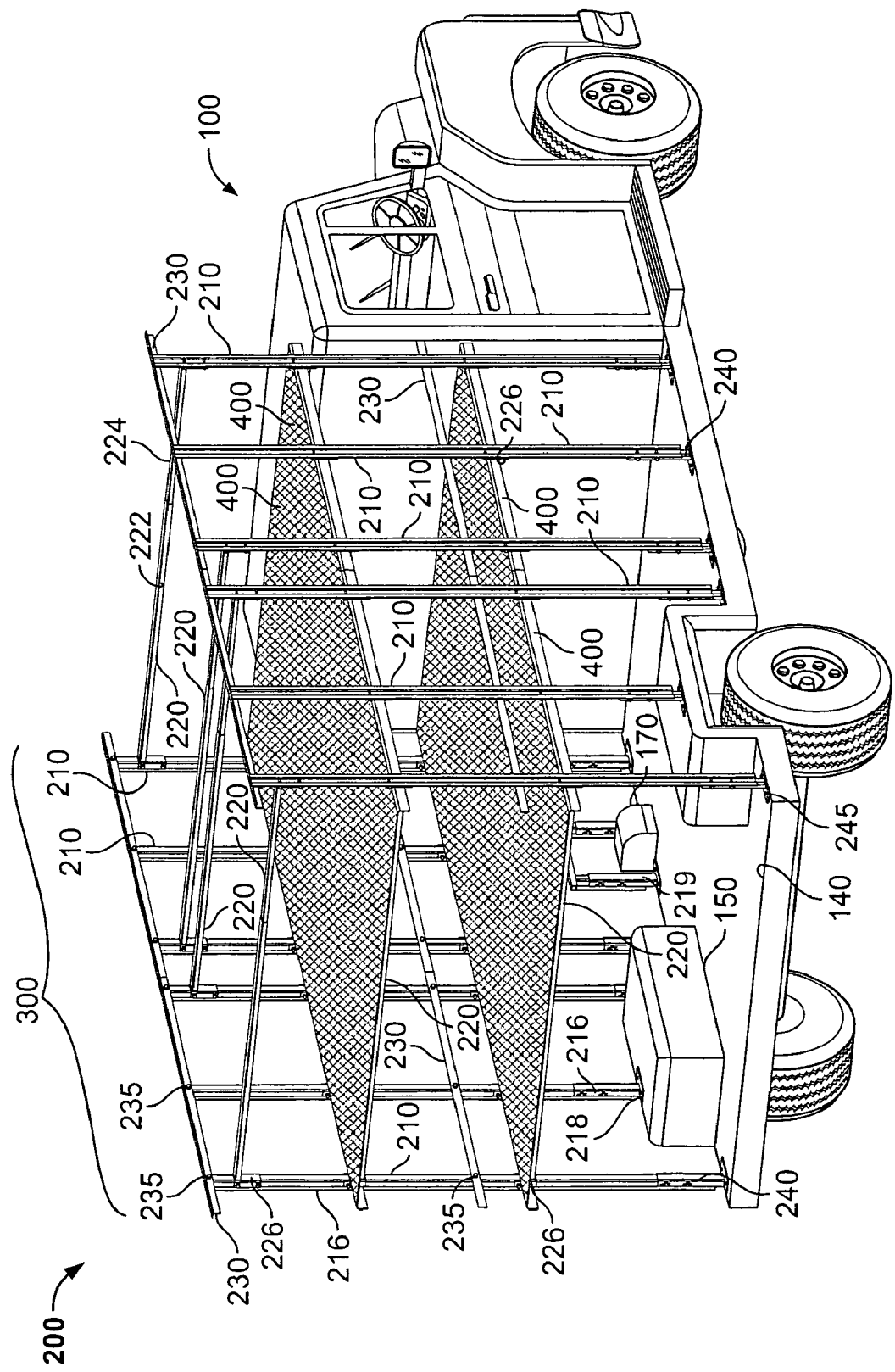
Figure 11:
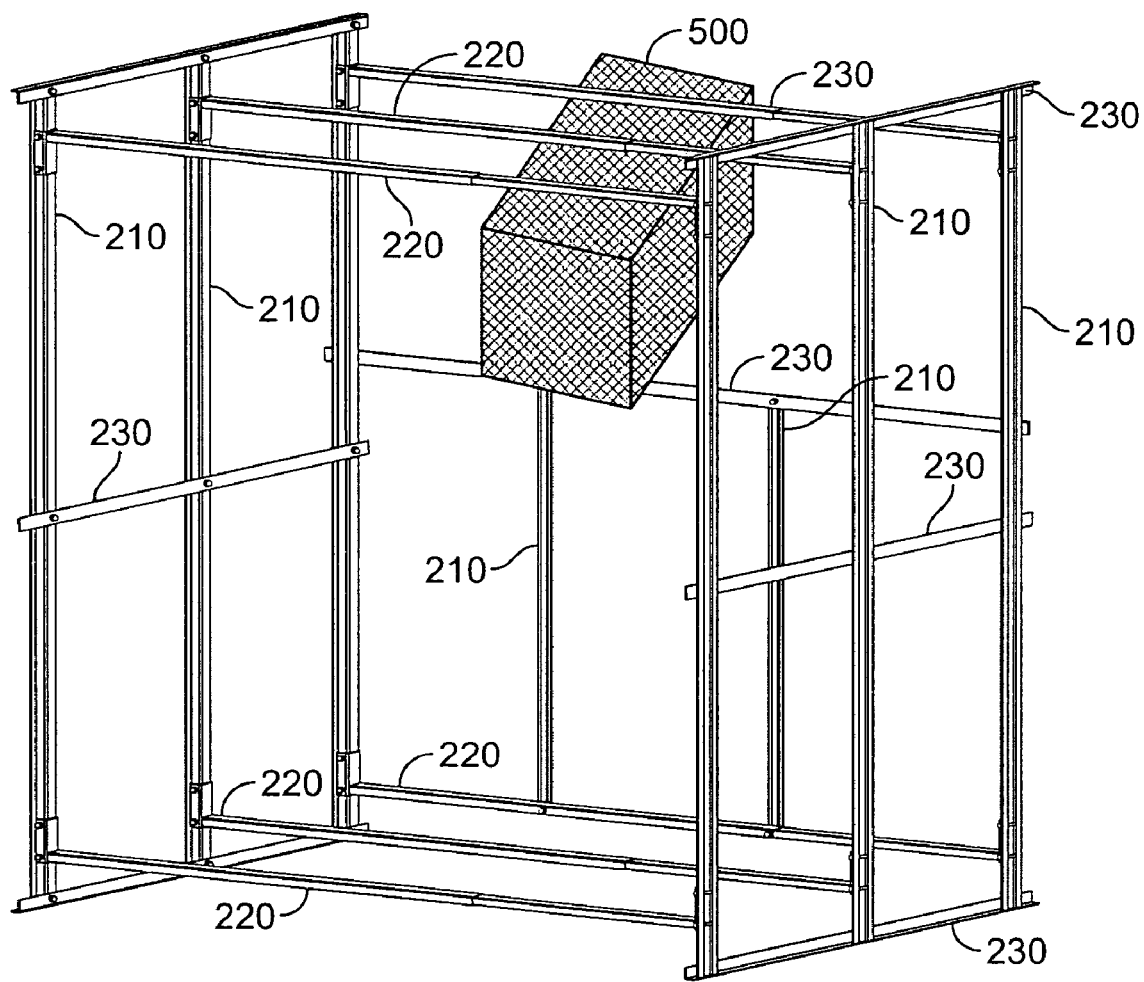
Figure 12:
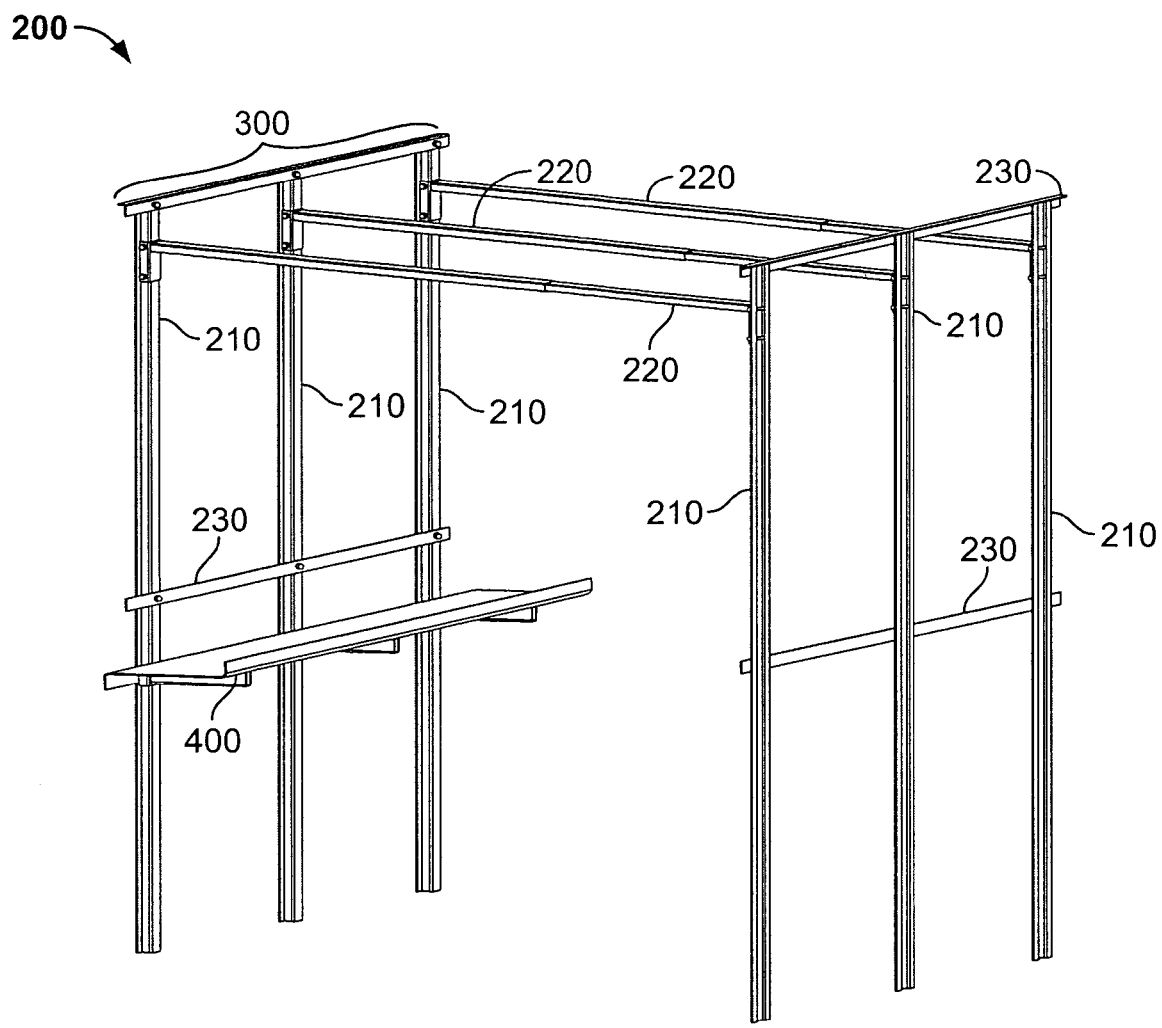
Figure 13:
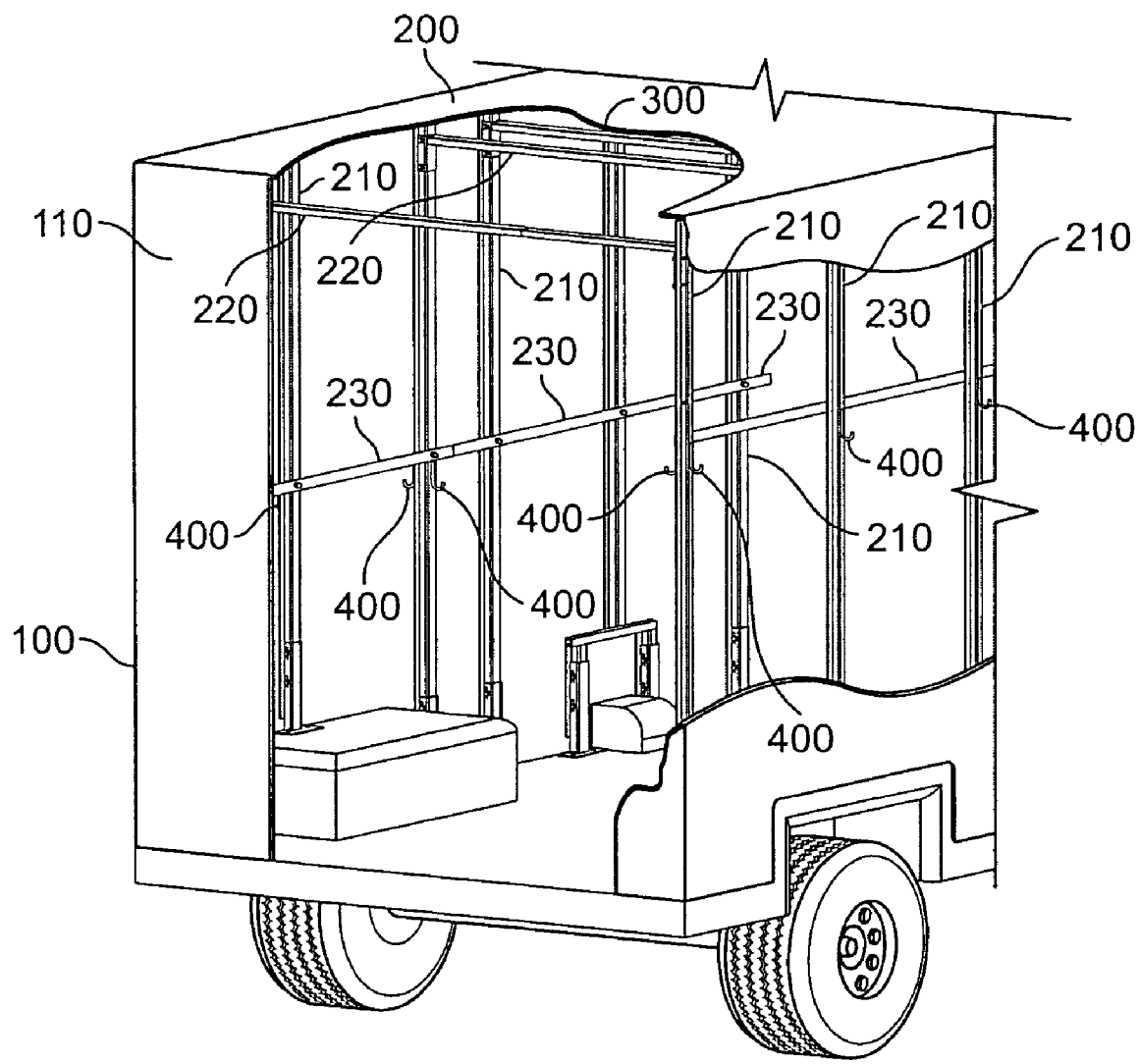
Figure 14:
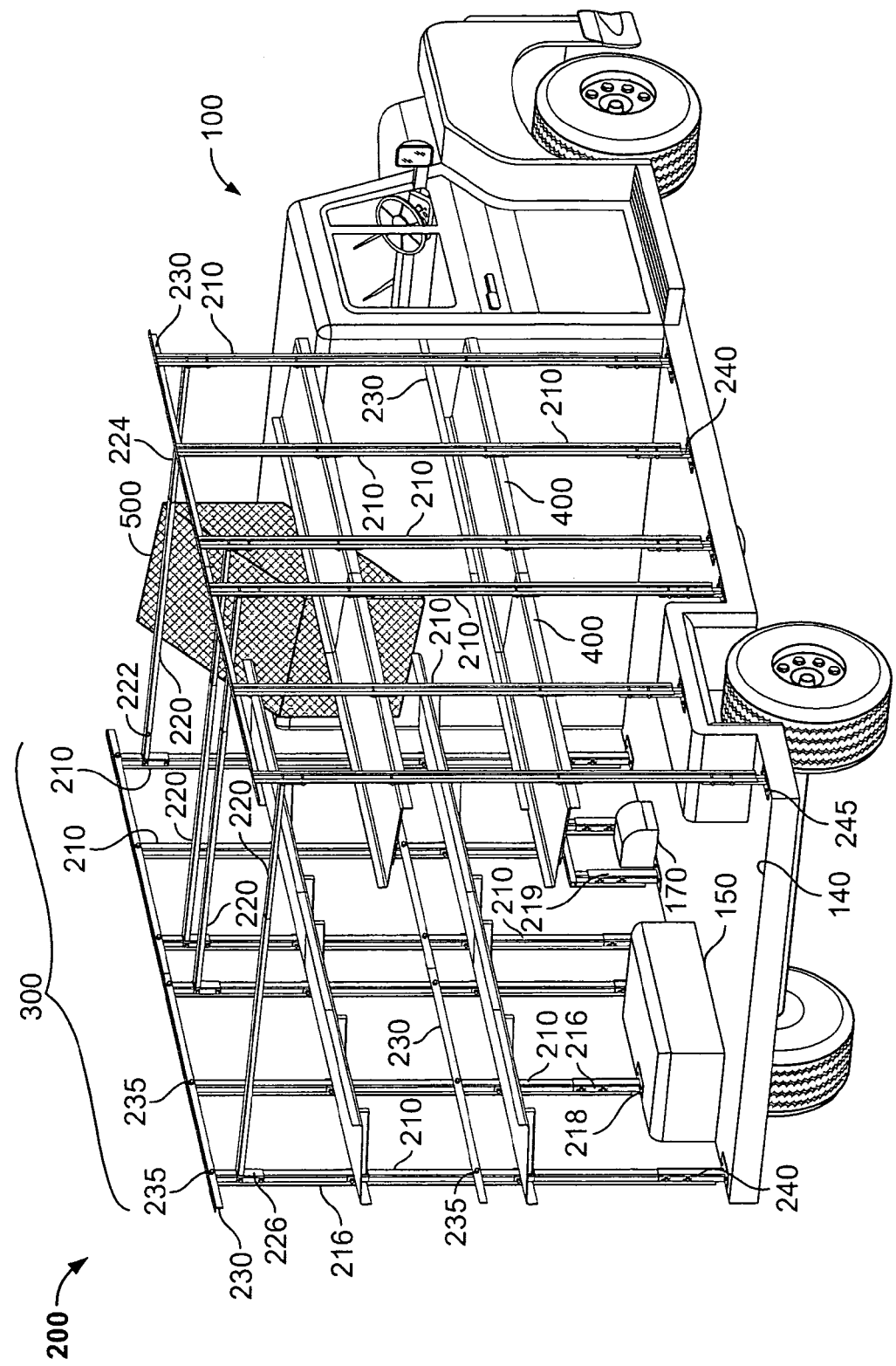

FIGS. 3A–D are perspective views of various embodiments of the vertical member 210 of the present invention;

FIG. 4 is a perspective view of an embodiment of the vertical member 210 of the present invention;

FIG. 5A–5B are perspective views of an embodiment of the transverse member 220 of the present invention;

FIG. 6 is a perspective view of an embodiment of the shelf 400 of the present invention;

FIGS. 7A–7B are perspective views of an embodiment of the support arm 420 of the present invention;

FIG. 8 is a perspective view of an embodiment of the adjustable foot 240 of the present invention;

FIG. 9 is a perspective view of an embodiment of the shelf 400 of the present invention;

FIG. 10 is a pictorial perspective view of a box truck without the walls/roof of the cargo area incorporating an embodiment of the structurally independent load bearing support system of the present invention supporting multiple platforms 400;

FIG. 11 is a pictorial perspective of an embodiment of the structurally independent load bearing support system of the present invention for use as a frame to build a cargo box or an enclosed structure;

FIG. 12 is a pictorial perspective of an embodiment of the structurally independent load bearing support system of the present invention;

FIG. 13 is a pictorial perspective view of a box truck without the right side wall of the cargo area incorporating an embodiment of the structurally independent load bearing support system of the present invention;

FIG. 14 is a pictorial perspective view of a box truck without the walls/roof of the cargo area incorporating an embodiment of the structurally independent load bearing support system of the present invention supporting multiple levels of shelves 400 and a refrigerator unit 500.

Figure 15:
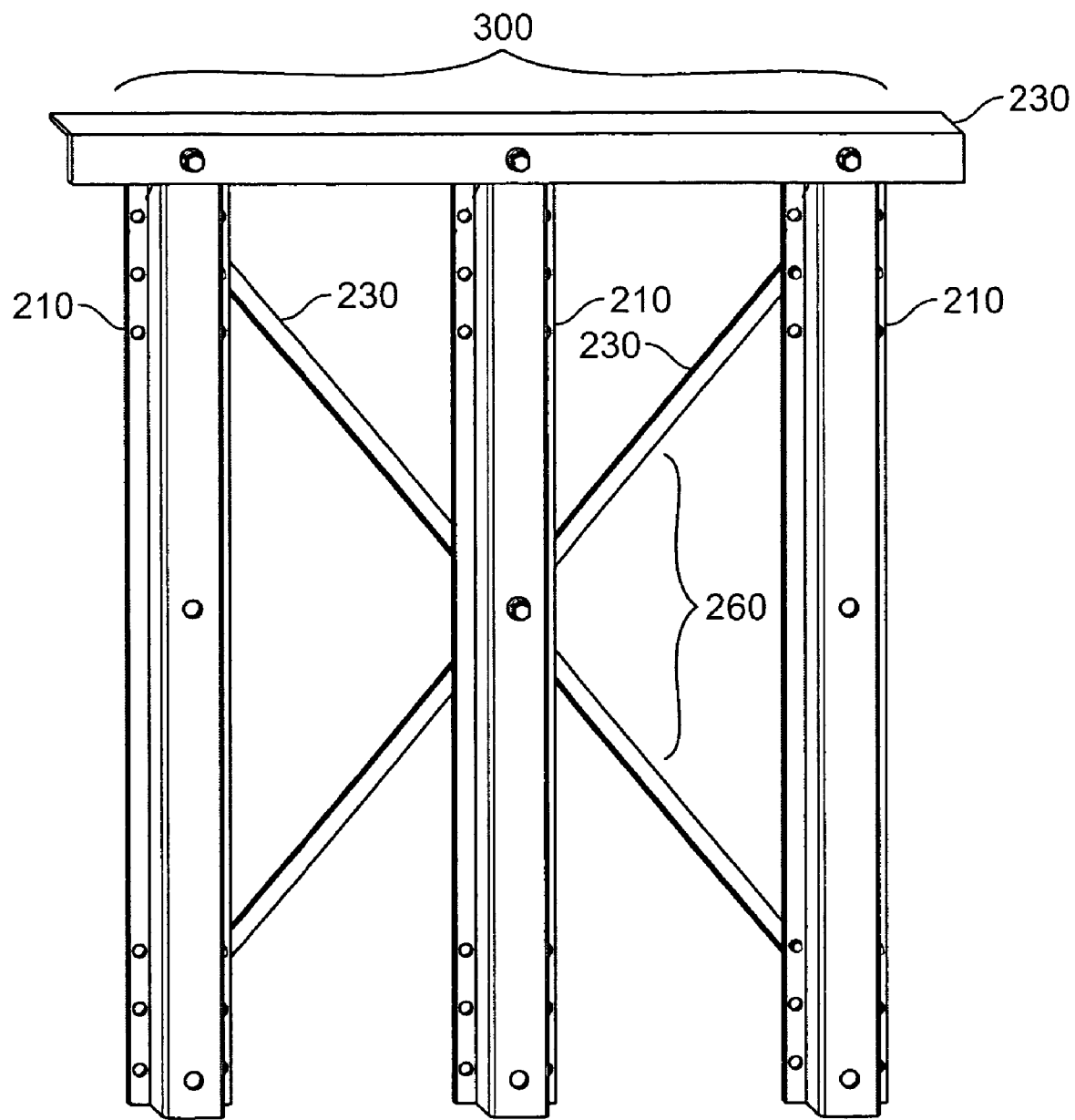
Figure 16:
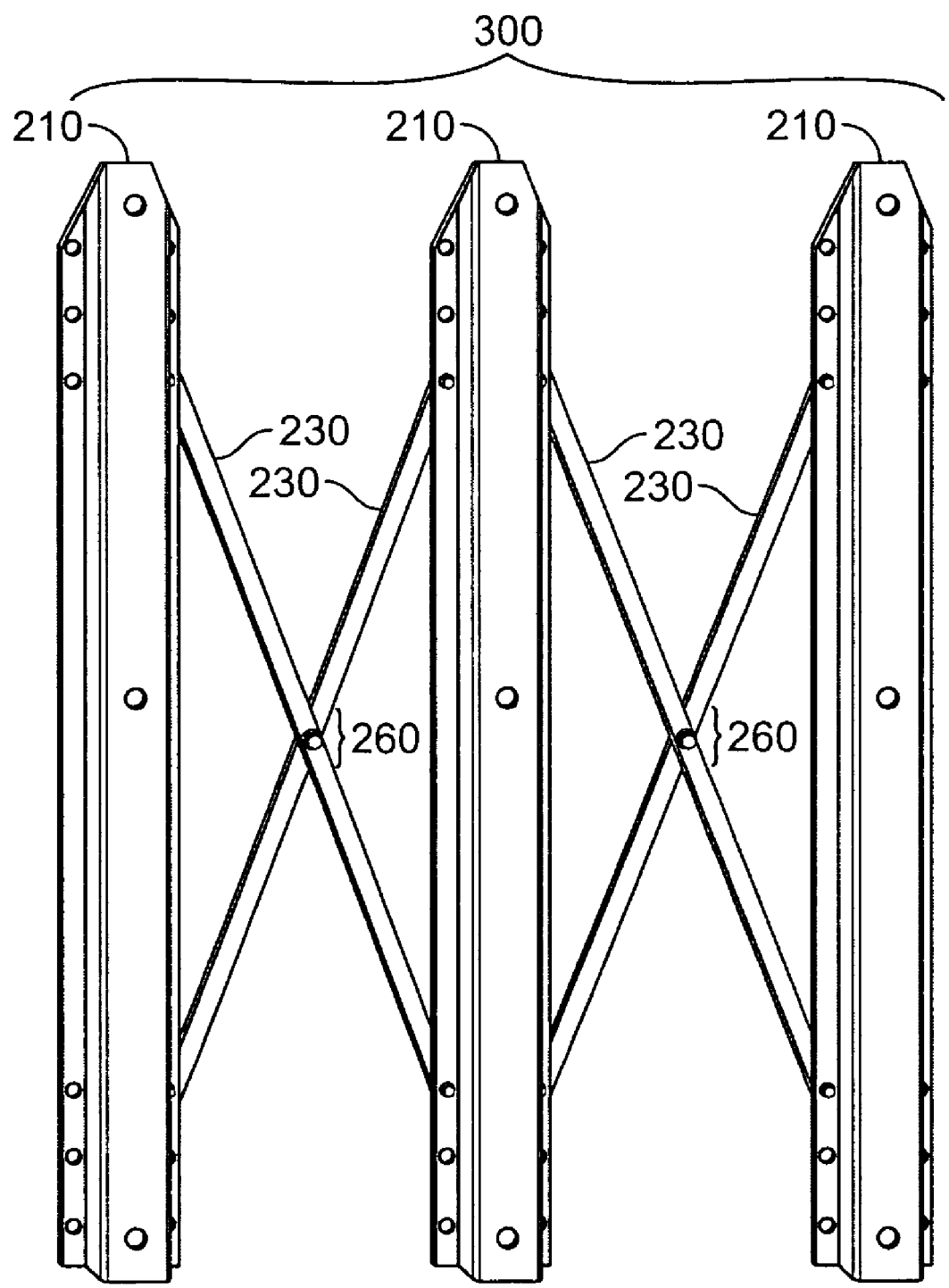

FIG. 15 is a pictorial perspective of the side frame of the present invention with a cross brace attached; and FIG. 16 is a pictorial perspective of the side frame of the present invention without a stabilization bar member and with two attached cross braces.

DETAILED DESCRIPTION OF THE EMBODIMENTS

The structurally independent load bearing support system of the present invention is applicable to box trucks, as well as any mobile workshops, delivery, service, and cargo vehicles, such as trailers, vans, trains, planes, freights, container vessels, ships and the like. The structurally independent load bearing support system of the present invention can be used as a frame or skeleton for building a structure, such as a shed, a warehouse, a trailer box, a cargo box and the like.

Figure 1:
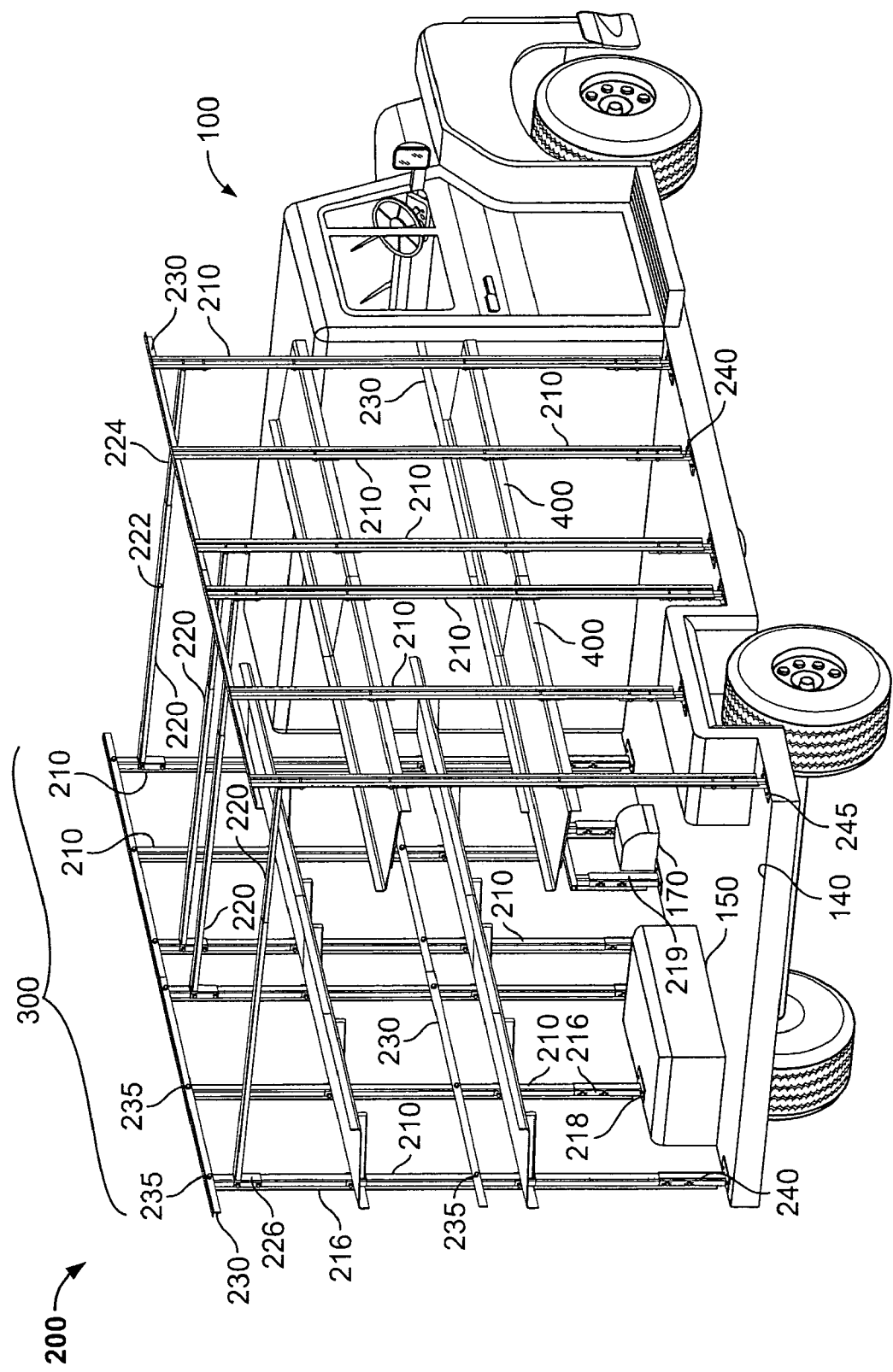
FIG. 1 is a pictorial perspective view of a box truck without the walls/roof of the cargo area incorporating an embodiment of the structurally independent load bearing support system of the present invention supporting multiple levels of shelves 400.
Figure 2:
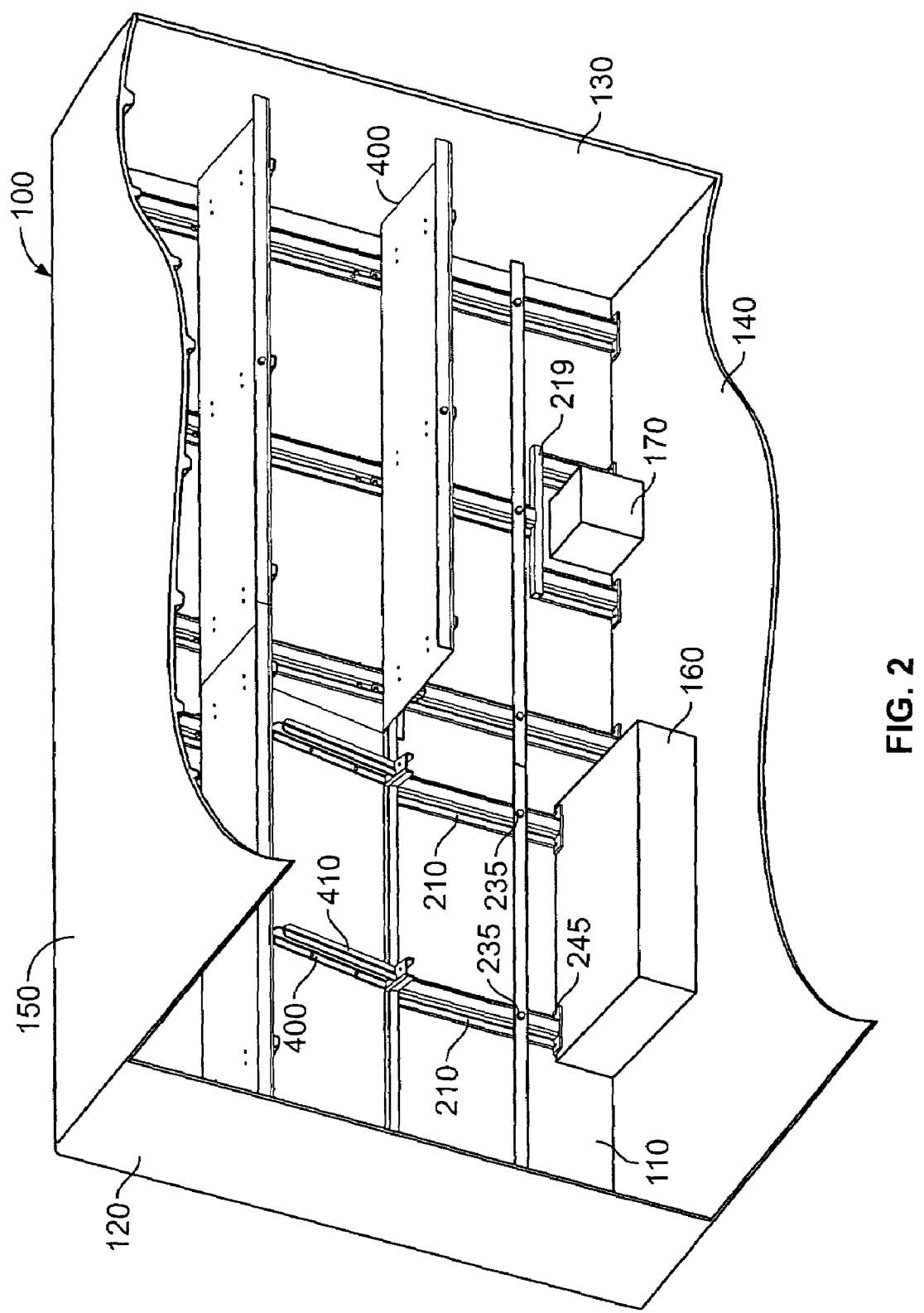
FIG. 2 is a cut-a-way perspective view of a cargo area of the box truck incorporating an embodiment of the structurally independent load bearing support system of the present invention.

Turning now to FIGS. 1 and 2, a box truck 100 which incorporates the structurally independent load bearing support system 200 in accordance with an embodiment of the present invention, is shown. It is appreciated that the support system 200 of the present invention can be assembled in the cargo area of the box truck 100 or pre-assembled outside of the cargo area (as shown in FIG. 12) and installed in the cargo area of the box truck 100. A typical box truck 100 includes two sidewalls 110 (only one shown for clarity in FIG. 2), a rear wall 120, a front wall 130, a floor 140, a roof 150, wheel wells 160, a fuel port cover 170 and one or more doors (not shown) on the rear wall 120 and/or one of the sidewalls 110.

In accordance with an embodiment of the present invention, the structurally independent load bearing support system 200 of the present invention, comprises a plurality of vertical members 210, one or more transverse members 220, and one or more stabilization bar members 230. The vertical members 210 support the accessories, such as shelves 400 (and other accessories (not shown), including but not limited to benches, bins, buckets, cots, hangars, hooks, platforms, drawers, and like), and transfer the dynamic and static loads directly onto the floor and mainframe of the box truck 100. The vertical members 210, transverse members 220, accessories or shelves 400, stabilization bar members 230 and other components noted herein are made, formed or molded of suitable load bearing material including but not limited to metal (i.e., steel, galvanized steel, aluminum, etc.), wood, vinyl, plastic, plastic resin, fiberglass, fiberglass reinforced plywood (FRP) and the like.

A first set of longitudinally spaced vertical members 210 are preferably located in close proximity to one of the sidewalls 110, and a second set of longitudinally spaced vertical members 210 are preferably located in close proximity to the other sidewall 110. It is appreciated that the longitudinal spacing between the vertical members 210 and the number of vertical members 210 in each set, can vary with the desired dimensions of the support system or to fit the various features and dimensions of the cargo area, i.e., the length of the box truck 100. That is, the longitudinal spacing and the number of vertical members 210 in each set can be selected based on the desired dimensions of the support system.

Each vertical member 210 in the set is connected to other vertical members 210 in the set by one or more stabilization bar members 230 to form a side frame 300. In accordance with an embodiment of the present invention, the side frame 300 can be constructed in predetermined dimensions and one or more side frames can be connected, such as using one or more stabilization bar members 230, to vary the length of the side frame 300 to fit a particular application. It is appreciated that the respective side frames 300 can have the same or different number of the vertical members 210, e.g., to account for a side door on one of the sidewalls 110. Preferably, one or more vertical members 210, in the respective side frames 300, are located in laterally respective opposing position. For example, a vertical member 210 in one respective side frame 300 is positioned in the same pre-determined distance from the front wall 130 or the rear wall 120 as the vertical member 210 in the other respective side frame 300. The stabilization bar members 230 are used to maintain the predetermined longitudinal spacing between the vertical members 210 and to provide alignment and stability. For example, as shown in FIG. 1, each vertical member 210 can be connected to another vertical member 210 in the set by at least two stabilization bar members 230, the first stabilization bar member 230 connecting the top portion of the vertical members 210 of the side frame 300 and the second stabilization bar member 230 connecting the middle or bottom portion of the vertical members 210 of the side frame 300. The stabilization bar members 230 can be connected to the vertical members 210 using self-locking bolts, bolts and nuts, latches, clasps, clips or any other comparable fastening means. In accordance with an aspect of the present invention, the first stabilization bar member 230 is angled, i.e., L-shaped, so as to cover the top of the vertical members 210, as shown in FIG. 1.

In accordance with an embodiment of the present invention, the vertical member 210 can be formed or molded as an elongated tube, post or channel 212, comprising one or more face portions 213 and two opposing side portions 215 having a plurality of predetermined spaced holes or openings 216 to receive any known connection or mounting means, including but not limited to bolts, pins, clips, rivets, clasps, etc. Exemplary vertical members 210 are shown in FIGS. 3A–D and 4, such as a rectangular tube or post, a u-shaped channel, or a u-shaped channel having side flanges and the like. Preferably, each vertical member 210 has at least two predetermined spaced holes or openings 214 on the face portion 213 to facilitate easy and quick installation of the first and second stabilization bar members 230 via any known connection and mounting means. For example, the openings 214 and 216 in the vertical members can be threaded to receive a bolt 235 or the like, the vertical members 210 can be formed or molded with nuts (not shown) behind and axially aligned with the openings 214 and 216, or the nuts can be welded onto the vertical members 210 so that bolts 235 with lock washers (or self-locking bolts) can be easily and quickly threaded into the nuts to secure the stabilization bar member 230 onto the vertical members 210, alternatively In accordance with an embodiment of the present invention, the vertical members 210, stabilization bar members 230, and the transverse members 220, can be manufactured in a predetermined size and cut accordingly to fit a particular application, i.e., cut to fit the various features and dimensions of the box truck 100 including the wheel well 150, the fuel port cover 170, the refrigeration unit 500 (as shown in FIG. 14), a window (not shown), a door (not shown), or follow the bowed design of the cargo floor 140 (the arc in the floor 140 is not shown in FIGS. 1 and 2). Alternatively, the vertical members 210, the stabilization bar members 230, and the transverse members 220, can be manufactured in a number of predetermined sizes to fit the various features and dimensions of the box truck 100, or to fit a particular application. Additionally, shims (not shown) can be used to adjust the height of the vertical member 210 so that it aligns with other vertical members 210 in the side frame 300, or so that it is at a predetermined height with respect to the roof 150. In accordance with an embodiment of the present invention, the vertical member 210 comprises a plurality of openings 214 on the face portion 213 and an adjustable foot 240 to adjust the height or length of the vertical member 210. Preferably, as shown in FIG. 8, the adjustable foot 240 can be formed or molded as an elongated u-channel comprising a face portion 241, two opposing side portions 242, and a floor plate 245 for securing the vertical member 210 to the floor 140 or the wheel well 150.

In accordance with an aspect of the present invention, the adjustable foot 240 comprises one or more holes or openings 243 on its face portion and/or one or more holes 244 on its opposing side portions 242. The holes 243 on the face portion of the adjustable foot 240, and the holes 214 on the face portion of the vertical member 210, are axially aligned. The adjustable foot 240 is then bolted or screwed (or by other comparable means) onto the vertical member 210 through the axially aligned holes 243 and 214 to obtain the desired height of the vertical member 210. Alternatively, the holes 244 on the opposing side portions 242 of the adjustable foot 240, and the holes 216 on the opposing side portions 215 of the vertical member 210, are axially aligned. As shown in FIG. 1, the adjustable foot 240 is then bolted or screwed (or by other comparable means) onto the vertical member 210 through the axially aligned holes 244 and 216 to obtain the desired height of the vertical member 210. It is contemplated that shims (or other comparable means) can also be used in conjunction with the adjustable foot 240 to adjust the height of the vertical member 210. Alternatively, the vertical member 210 comprises an inner portion and outer portion (not shown), wherein the outer portion slides over the inner portion in one direction to shorten the vertical member 210, and slides in the other direction to lengthen the vertical member 210.

Although it is preferable to secure the vertical members 210 (including any adjustable foot 240 and/or shims) directly to the floor 140 of the cargo area, it may not be possible or practical to do so for all vertical members 210 of the structurally independent load bearing support system 200. For example, the frame sections 210 may need to be shortened and shimmed to mount directly on to the wheel well 160 as shown in FIGS. 1 and 2. In accordance with an aspect of the present invention, the vertical member 210 can comprise a forked section 219 to straddle objects, such as a fuel port cover 170, as shown in FIGS. 1 and 2.

Once the side frames 300 are constructed, e.g., two side frames 300 for the box truck application, they are connected using one or more transverse members 220 to form a structurally independent load bearing support system of the present invention. In accordance with an embodiment of the present invention, a transverse member 220 connects a vertical member 210 in one side frame 300 to a vertical member 210 in the other side frame 300, which are located in laterally respective opposing positions. Preferably, one or more transverse members 220 are used to connect one or more laterally respective vertical members 210 in the opposing side frames 300. In an exemplary box truck application, as shown in FIG. 1, four transverse members are used to connect four laterally respective vertical members 210 in the opposing side frames 300 to form a structurally independent load bearing support system of the present invention. Alternatively, one or more transverse members 220 are connected to the respective first stabilization bar member 230 located near the top of the opposing side frames 300 (not shown).

In accordance with an embodiment of the present invention, as shown in FIGS. 1 and 5A–B, the transverse member 220 can be formed or molded as an elongated beam, strut, rib, tube, and the like, having a bracket 226 at each end. Alternatively, the brackets 224 are welded, riveted or connected by other comparable means to each end of the transverse member 220. The brackets 226 are used to connect the transverse members 220 to the vertical members 210 by any known means, such as bolts/nuts, clips, latches, hooks, rivets, depressions/protrusions which, clips or fits into one or more openings 214 or 216 on the vertical members 210. Preferably, the bracket 226 can be formed or molded as a u-channel comprising a face portion 227 and two opposing side portions 228, for securing the transverse member 220 to the vertical member 210.

In accordance with an embodiment of the present invention, the bracket 226 comprises one or more holes or openings 229 on its opposing side portions 228 and/or one or more holes on its face portion 227 (not shown). The holes 229 on the respective opposing side portions 228 of the bracket 226, and the holes 216 on the respective opposing side portions 215 of the vertical member 210, are axially aligned. As shown in FIG. 1, the bracket 226 is then bolted or screwed (or by other comparable means) onto the vertical member 210 through the axially aligned holes to securely attach the transverse member 220 to the vertical member 210. Alternatively, the holes on the face portion 227 of the bracket 226, and the holes 214 on the face portion 213 of the vertical member 210, are axially aligned. The bracket 226 is then bolted or screwed (or by other comparable means) onto the vertical member 210 through the axially aligned holes to securely attach the transverse member 220 to the vertical member 210.

In accordance with an embodiment of the present invention, the transverse member 220 comprises a telescopic inner member 224 and a telescopic outer member 222. The proximal end of the inner member 224 is inserted inside the outer member 222 via its proximal end to adjust the length of the transverse member 220. Each inner member 224 and outer member 222 comprises a bracket 226 at its distal end, which can be formed or molded together with its corresponding inner member 224 and outer member 222. Alternatively, the brackets 226 are welded, riveted, or connected by other comparable means to the distal ends of the inner members 224 and outer members 222, respectively. The length of the transverse members 220 can be adjusted by inserting or pulling the inner member 224 further into or out of the outer member 222. For example, the proximal end of the inner member 224 is inserted deeper into the outer member 222 to shorten the transverse member 220, and vice-versa, to lengthen the transverse member 220. In accordance with an embodiment of the present invention, opposing faces of the inner members 224 and outer members 222 comprise a plurality of hole pairs, preferably near the proximal end, for securing the outer member 222 to the inner member 224 to maintain desired length of the transverse member 220. Preferably, the inner member 224 has a plurality of hole pairs and the outer member 222 has two hole pairs, as shown in FIG. 5A. For example, the outer members 222 can be formed or molded with nuts 223 on one of the opposing faces having the holes and each nut 223 being axially aligned with one of the holes. Alternatively, the nuts 223 can be welded onto the outer members 222 so that self-locking bolts (not shown), or bolts with lock washers (not shown), can easily and quickly be inserted through matching hole pairs of the inner members 224 and outer members 222 and threaded into the nuts to secure the outer member 222 to the inner member 224. Conversely, the inner member 224 can have a plurality of holes and the outer member 222 can include clips which can be removably inserted into the holes of the inner member 224 to adjust the length of the transverse member 220 and securely connect the outer member 222 to the inner member 224.

Once the structurally independent load bearing support system of the present invention is built and installed in the cargo area, the accessories 400, such as the shelves, benches, hangars, drawers, platforms, hooks, clips, bins, buckets and the like, and the transverse member 220, inner member 224, outer member 222, and support arms 420, can be mounted on either side of the vertical members 210, to provide one or more additional levels of load bearing surfaces (depending on the particular application of the present invention). For example, as shown in FIG. 10, one or more transverse members 220 can be connected at different levels of the vertical member 210 to provide one or more levels of load bearing surfaces or platforms 400 in addition to the floor 140 of the cargo vehicle 100. It is appreciated that such multiple platforms 400 can be used to transport breads, bakery goods and the like.

Turning now to FIG. 6, in accordance with an embodiment of the present invention, each shelf 400 comprises a shelf member 410 having an upturned lip or edge 415 at the distal end and two or more support arms 420 attached to underside of the shelf member 410. The upturned edge 415 functions to keep the cargo or packages from sliding off the shelves 400 during transport or loading. Additionally, in the utility position, the shelves 400 can be angled slightly upward to keep the cargo from sliding off the shelves 400. The shelves 400 can be angled, with respect to the vertical member 210 (as shown for example in FIG. 1) anywhere from about 0 to about 180 degrees, depending on whether the utility of the shelves is for display (angled more than 90 degrees) or for transport (angled less than 90 degrees). For example, as shown in FIG. 7A, the distal end of the support arm 420 can be angled slightly upward by 0 degrees, so that the distal end is higher than the proximal end. The shelf member 410 and one or more support arms 420 can be formed or molded together as a single piece. Alternatively, the support arms 420 can bolted, riveted, welded, latched, hooked, clipped or connected by other comparable means, to the shelf member 410.

Figure 3B:
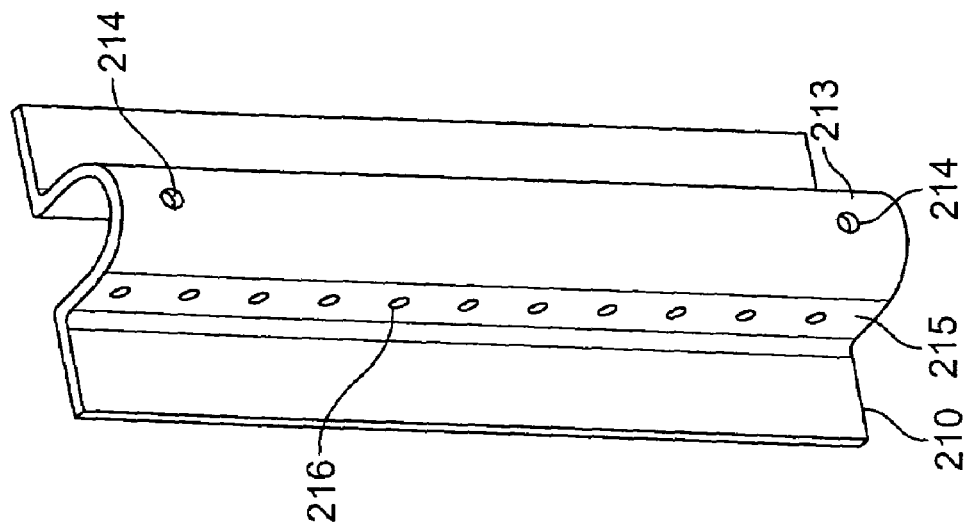
Figure 3A:
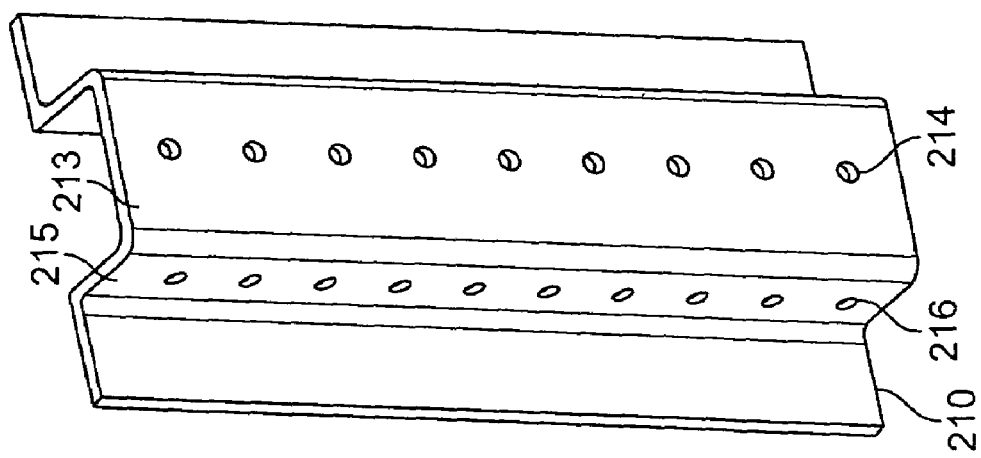
Figure 3D:
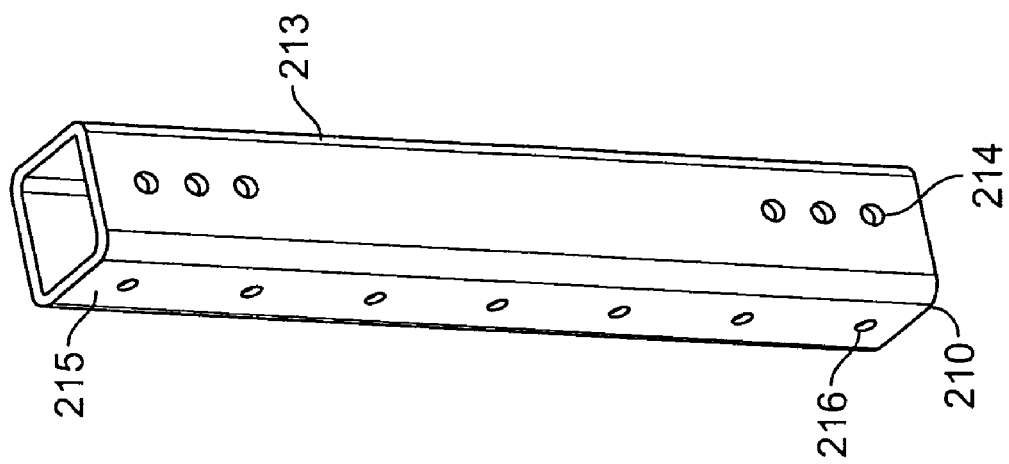
Figure 3C:
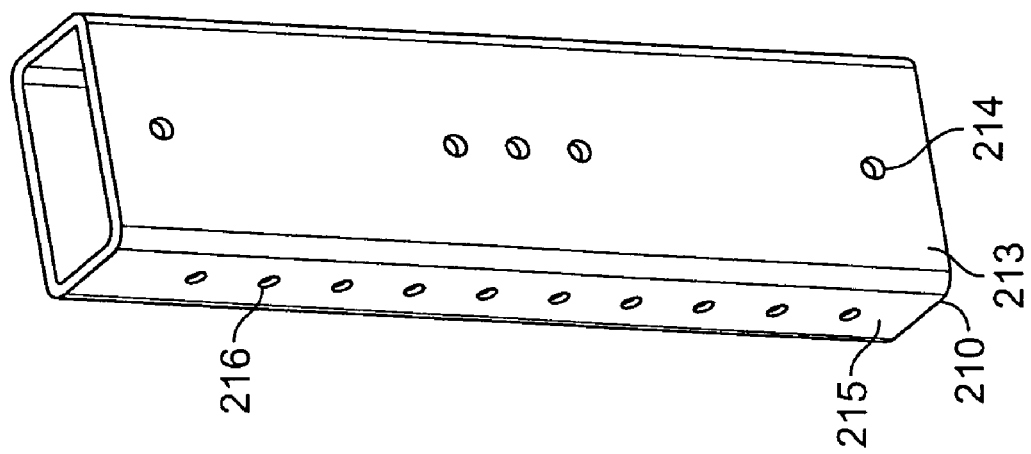

In accordance with an embodiment of the present invention, each support arm 420 can be formed or molded as a rectangular shaped tube as shown in FIG. 7B, an L-shaped bar, a U-channel having side flanges as shown in FIGS. 3A–B, a pair of U-channels, and the like, having a bracket 430 at its proximal end. Preferably, the shelf 410 comprises two or more indentations or cut-out portions 417 for receiving the brackets 430, as shown in FIG. 6, thereby enabling the shelf to be mounted flush against the vertical member 210. Preferably, the upturned edge 415 also comprises two or more indentations or cut-out portions to enable the shelf to be mounted flush against the vertical member 210. Alternatively, the bracket 430 is welded, riveted or connected by other comparable means to the proximal end of the each support arm 420. Preferably, the bracket 430 can be formed or molded as a U-channel comprising a face portion 431 and two opposing side portions 432 for securing the shelf 400 to the vertical member 210.

In accordance with an aspect of the present invention, each opposing side portion 432 of the bracket 430 comprises one or more holes or openings 433, preferably two holes. The holes 433 on the two opposing side portions 228 of the bracket 430, and the selected holes 216 on the respective opposing side portions 215 of the vertical member 210, are axially aligned. As shown in FIG. 1, the bracket 430 is then bolted or screwed (or by other comparable means) onto the vertical member 210 through the first axially aligned pair of holes 433 located towards the top of the bracket to securely and rotatably mount the supporting arm 420 and the shelf 400 to the vertical member 210. Preferably, the bracket 430 does not extend beyond the bottom of the support arm 420 so as to minimize the protrusion of the bracket when the shelves 400 are in their storage position. Additionally, the side portions 432 of the bracket 430 preferably extend beyond the shelf member 410, as shown in FIGS. 1 and 6, so that the pivot axis of the shelves 400 are above the shelf member 410. This arrangement advantageously provides that when the shelf 400 is rotated upward to its storage position, it is substantially vertical or parallel to the sidewall 110 of the box truck 100 thereby minimizing the storage space. It is appreciated that the shelf 400 is rotated downward to its utility position, which is established when the bracket 430 engages the vertical member 410, particularly the front face portion 213 of the vertical member 210, thereby advantageously requiring the load bearing vertical members 210 to support the shelves 400 and the cargo/packages thereon. This also enables the structurally independent load bearing support system 200 of the present invention to carry more cargo than the conventional racking system.

To ensure that the shelves 400 stay in their utility position, the bracket 430 is additionally bolted, clipped, hooked, screwed, retained via a retaining pin (or by other comparable means) onto the vertical member 210, through the second axially aligned pair of holes 433 located towards the bottom of the bracket, to securely mount the supporting arm 420 and the shelf 400 to the vertical member 210. Accordingly, the bolt, screw or retaining pin is removed from the second axially aligned pair of holes 433 to allow upward rotation of the shelves 400 to their storage position. The supporting arm 420 can additionally include a spring mechanism to keep the shelves 400 in their storage position unless the retaining pin or bolt is inserted into the second axially aligned pair of holes 433. Alternatively, the shelves 400 are restrained in their storage position by a hook (or by other comparable means) attached to the side frame 300.

Although the various embodiments of the present invention are described in conjunction with the box truck 100, it is appreciated that the structurally independent load bearing support system has a wide range of applications in delivery, service and cargo vehicles, such as cargo planes, vans, trailers, trains, container ships, service trucks, or emergency vehicles wherein the shelves 400 are replaced with benches or cots, and the like, to hold patients.

Turning now to FIG. 11, in accordance with an embodiment of the present invention, the structurally independent load bearing support system 200 can be used as a skeleton or structural frame to build a box truck, trailer, refrigeration unit, cargo box, building, shed, warehouse, and the like. That is, for a box truck application, the sidewalls 110 (not shown), the rear wall 120 (not shown), the front wall 130 (not shown), the floor 140 (not shown) and the roof 150 (not shown) can be attached to at least one of the following: the stabilization bar member 230, the vertical member 210 and the transverse member 220 of the structurally independent load bearing support system 200 via any connection means, such as bolts, latches, rivets, hooks, clips, clasps, pins, etc. In other words, the structurally independent load bearing support system 200 of the present invention can serve as the structural frames to which any accessories, such as walls, roofs, doors, windows, floors, refrigeration unit 500, ladder racks and the like, can be attached thereto to pre-build any structure.

Turning now to FIG. 13, there is illustrated an embodiment of the structurally independent load bearing support system 200. This embodiment shows each side frame 300 spaced closer with respect to one another, and spaced further away from the respective side walls 110 of the box truck 100. In accordance with this embodiment of the present invention, both sides of each respective side frame 300 of the structurally independent load bearing support system 200 is utilized for connecting accessories 400. Accessories 400 (e.g., drawers 400, hooks 400 to hold ladders, buckets and the like) can be attached to the inside and/or the outside of the respective side frames 300.

Turning now to FIG. 15, there is shown an embodiment of the side frame 300 of the present invention. The side frame comprises at least three vertical members 210 and at least two stabilization bar members 230 forming a cross brace 260. The cross brace 260 provides added stability and facilitates alignment of the longitudinally spaced vertical members 210. In accordance with an aspect of the present invention, each stabilization bar member 230 comprises a tension wire or cable for adjusting the tension of the cross brace 260. Additionally, each stabilization bar member 230 can comprise a wire, a flat bar or round bar made of any durable material, such as metal, plastic, wood, etc. Each end of the respective stabilization bar members 230 can be attached to a different vertical member 210 within the same side frame by a bolt, rivet, screw, clip, nail, glue, epoxy, or by any other means. Furthermore, where the stabilization bar members "cross", they can attach to each other, to another vertical member 210, or to both, by a bolt, screw, rivet, nail, clip, glue, epoxy, or by any other means.

In accordance with aspect of the present invention, the transverse members 220 can form a cross brace (not shown) but similar to the cross brace 260. Each end of the respective transverse members can be attached to a different vertical member 210 (not shown), or, alternatively, to a different stabilization bar member 230 by a bolt, rivet, screw, clip, nail, glue, epoxy, or by any other means. Similarly to the cross brace 260 shown in FIG. 15, where the transverse members "cross", they can attach to each other, to another transverse member 220 (not shown), or to both, by a bolt, screw, rivet, nail, clip, glue, epoxy, or by any other means.

In accordance with an embodiment of the present invention, although FIG. 16 shows a side frame 300 with three vertical members 210 and two cross braces 260, it is appreciated that one or more cross braces 260 can be used to attached two or more vertical members 210. Although not shown, this applies equally to the cross brace formed from the transverse members 220. This facilitates expansion and contraction of the structurally independent load bearing support system of the present invention. The cross brace 260 provides added stability. As discussed herein, the stabilization bar members 230 can comprise a tension wire or cable. These stabilization bar members 230 can be loosened, unattached, and then reattached to different parts of the same respective vertical members 210 and retightened, to allow the vertical members 210 in the same respective side frame 300 to move closer to one another. This embodiment of the present invention frees up cargo space in the cargo area of the box truck 100 (not shown). Alternatively, these stabilization bar members 250 can be loosened, unattached, and then reattached to different parts of the same respective vertical members 210 and retightened, to allow the vertical members 210 in the same respective side frame 300 to move further away from one another. Preferably, the end of the stabilization bar member 230 can be vertically adjusted on the vertical member 210 using any known means, e.g., a slide hole or multiple holes, etc.

It will be understood that other and further improvements and changes can be made to the exemplary embodiments disclosed herein without departing from the spirit and scope of the present invention.

What is claimed is:

1. A structurally independent load bearing support system for use in a cargo vehicle, comprising:
    at least two opposing side frames, each side frame comprising a plurality of longitudinally spaced vertical members, each vertical member connected to another vertical member of the same respective side frame by one or more stabilization bar members to provide stability and alignment of said plurality of longitudinally spaced vertical members; and
    at least one transverse member, said at least one transverse member connects opposing vertical members in the respective opposing side frames to form a structurally independent load bearing support system not supported by the side walls of said cargo vehicle for supporting one or more levels of accessories, thereby providing one or more additional levels of load bearing surfaces for said cargo vehicle; and
    wherein at least one level of accessories comprises a load bearing surface, wherein said load bearing surface is one of the following: a shelf, bench, cot, bucket, bin, drawer, sliding rack, and platform.

2. The structurally independent load bearing support system of claim 1, wherein said at least one transverse member is an adjustable transverse member such that the length of said at least one transverse member is adjustable.

3. The structurally independent load bearing support system of claim 1, wherein said accessory comprises a bracket at the proximal end for connecting said accessory to a vertical member.

4. The structurally independent load bearing support system of claim 1, wherein said accessory comprises a support arm for connecting said accessory to a vertical member.

5. The structurally independent load bearing support system of claim 4, wherein said support arm is a transverse member.

6. The structurally independent load bearing support system of claim 1, wherein said accessory is molded with one or more support arms, wherein each support arm comprises a bracket at the proximal end for connecting said support arm to a vertical member.

7. The structurally independent load bearing support system of claim 1, wherein said accessory is a shelf, said shelf comprises one or more indentations at its proximal end to receive a bracket, thereby enabling said shelf to be mounted flush against said plurality of longitudinally spaced vertical members.

8. The structurally independent load bearing support system of claim 7, wherein said bracket comprises a U-channel having a face portion and two opposing side portions, each of said two opposing side portion comprises at least one depression to provide at least one depression pair for said bracket; wherein each vertical member comprises a U-channel having a face portion and two opposing side portions, each opposing side portion having a plurality of openings to receive said depression pair to securely attach said shelf to a vertical member.

9. The structurally independent load bearing support system of claim 8, wherein each of said two opposing side portions extends beyond said face portion to enable said shelf to rotate upward to a storage position and rotate downward to an utility position with respect to said depression pair.

10. The structurally independent load bearing support system of claim 7, wherein said bracket comprises a U-channel having a face portion and two opposing side portions, each of said two opposing side portion comprises at least one opening to provide at least one opening pair for said bracket; wherein each vertical member comprises a U-channel having a face portion and two opposing side portions, each opposing side portion having a plurality of openings to provide a plurality of opening pairs; wherein said bracket is connected to said vertical member by axially aligning said at least one opening pair on said bracket to an opening pair on said vertical member and inserting a bolt or pin through said axially aligned opening pairs, thereby transferring the weight of said shelf onto said plurality of longitudinally spaced vertical members.

11. The structurally independent load bearing support system of claim 10, wherein each of said two opposing side portions extends beyond said face portion to enable said shelf to rotate upward to a storage position and rotate downward to an utility position with respect to said bolt.

12. The structurally independent load bearing support system of claim 1, wherein said accessory is a load bearing surface, wherein said load bearing surface is connected to one or more said vertical members, and wherein said load bearing surface is held at an angular position with respect to said vertical member from about 0 to about 180 degrees.

13. The structurally independent load bearing support system of claim 1, wherein said at least one transverse member comprises a bracket at each end for connecting said at least one transverse member to opposing vertical members of the respective opposing side frames.

14. The structurally independent load bearing support system of claim 2, wherein said at least one transverse member is a telescopic member comprising an outer member and an inner member, wherein said inner member is insertable into said outer member and moves with respect to said outer member to adjust the length of said at least one transverse member.

15. The structurally independent load bearing support system of claim 1, wherein said cargo vehicle has various features and dimensions; and wherein at least one or more of said members of the support system are non-uniform in size or shape to support or accommodate said various features and dimensions of said cargo vehicle.

16. The structurally independent load bearing support system of claim 1, wherein said each vertical member comprises an adjustable foot for adjusting the height of said each vertical member.

17. The structurally independent load bearing support system of claim 16, wherein said adjustable foot includes a floor plate for connecting said support system to the floor of said cargo vehicle.

18. The structurally independent load bearing support system of claim 1, wherein the number of said plurality of longitudinally spaced vertical members and the longitudinal spacing between said each vertical member in each opposing side frame varies with the various features and dimensions of said cargo vehicle.

19. The structurally independent load bearing support system of claim 1, wherein said plurality of longitudinal spaced vertical members and said at least one transverse member are constructed of at least one of the following suitable load bearing material: steel, aluminum, plastic, vinyl, plastic resin, fiberglass, and fiberglass reinforced plywood.

20. The structurally independent load bearing support system of claim 1, wherein said cargo vehicle is one of the following: truck, van, trailer, train, plane and ship.

21. The structurally independent load bearing support system of claim 1, wherein said at least two opposing side frames are mounted flush with the respective walls, floor, and ceiling of the cargo area in order to utilize substantially all of the cargo space of said cargo vehicle, both vertically and horizontally.

22. The structurally independent load bearing support system of claim 1, wherein each of said at least two opposing side frames have two sides, a first side which faces a cargo wall and a second side which faces the other respective opposing side frame, and wherein said at least two opposing side frames are positioned in a manner such that there is space defined between said first side of each respective opposing side frame and the cargo wall.

23. The structurally independent load bearing support system of claim 22, wherein at least one of said accessories is connected to at least one side of an opposing frame.

24. The structurally independent load bearing support system of claim 1, wherein said system transfers its weight and the weight of load bearing elements supported by said system to one or more load bearing structures of the cargo vehicle.

25. The structurally independent load bearing support system of claim 15, wherein said various features comprises at least one of the following: a door, refrigerator unit, wheel well, fuel port, and window.

26. The structurally independent load bearing support system of claim 1, wherein said members of the support system are manufactured in a predetermined size and are cut accordingly to fit various features and dimensions of said cargo vehicle.

27. The structurally independent load bearing support system of claim 1, wherein at least one accessory is an open bin to display products to customers.

28. The structurally independent load bearing support system of claim 1, further comprising a cross brace formed of at least two stabilization bar members.

29. The structurally independent load bearing support system of claim 28, wherein said cross brace connects at least two different longitudinally spaced vertical members.

30. The structurally independent load bearing support system of claim 1, further comprising a cross brace formed of at least two transverse members.

31. The structurally independent load bearing support system of claim 30, wherein said cross brace connects said opposing side frames.

32. A structurally independent load bearing support system for use in a cargo vehicle manufactured by the process comprising the steps of:
assembling at least two opposing side frames, wherein each side frame comprises a plurality of longitudinally spaced vertical members, by connecting each said vertical member to another vertical member within each respective side frame by one or more stabilization bar members to provide stability and alignment of said plurality of longitudinally spaced vertical members; and
connecting opposing vertical members in the respective opposing side frames by at least one transverse member to form a structurally independent load bearing support system not supported by the side walls of said cargo vehicle for supporting one or more levels of accessories, thereby providing one or more additional levels of load bearing surfaces for said cargo vehicle; and
wherein at least one level of accessories comprises a load bearing surface, wherein said load bearing surface is one of the following: a shelf, bench, cot, bucket, bin, drawer, sliding rack, and platform.

33. The structurally independent load bearing support system for use in a cargo vehicle manufactured by the process of claim 32, wherein said at least one transverse member is an adjustable transverse member such that the length of said at least one transverse member is adjustable.

34. The structurally independent load bearing support system for use in a cargo vehicle manufactured by the process of claim 33, wherein said at least one transverse member is a telescopic member comprising an outer member and an inner member, wherein said inner member is insertable into said outer member and moves with respect to said outer member to adjust the length of said at least one transverse member.

35. The structurally independent load bearing support system for use in a cargo vehicle manufactured by the process of claim 32, wherein said each vertical member comprises an adjustable foot for adjusting the height of said each vertical member.

36. The structurally independent load bearing support system for use in a cargo vehicle manufactured by the process of claim 32, wherein said cargo vehicle is one of the following: truck, van, trailer, train, plane and ship.

37. The structurally independent load bearing support system for use in a cargo vehicle manufactured by the process of claim 32, wherein said at least two opposing side frames are mounted flush with the respective walls, floor, and ceiling of the cargo area in order to utilize substantially all of the cargo space of said cargo vehicle, both vertically and horizontally.

38. The structurally independent load bearing support system for use in a cargo vehicle manufactured by the process of claim 32, wherein each of said at least two opposing side frames have two sides, a first side which faces a cargo wall and a second side which faces the other respective opposing side frame, and wherein said at least two opposing side frames are positioned in a manner such that there is space defined between said first side of each respective side frame and the cargo wall.

39. The structurally independent load bearing support system for use in a cargo vehicle manufactured by the process of claim 38, wherein at least one of said accessories is connected to at least one side of an opposing side frame.

40. The structurally independent load bearing support system for use in a cargo vehicle manufactured by the process of claim 32, wherein said system transfers its weight and the weight of load bearing elements supported by said system to one or more load bearing structures of the cargo vehicle.

41. The structurally independent load bearing support system for use in a cargo vehicle manufactured by the process of claim 32, wherein said members of the support system are manufactured in a predetermined size and are cut accordingly to fit various features and dimensions of said cargo vehicle.

42. A kit for assembling a structurally independent load bearing support system for use in a cargo vehicle, the kit comprising:
a plurality of load bearing vertical members for forming at least two opposing side frames;
one or more stabilization bar members for connecting said vertical members of each respective side frame; and
at least one transverse member for connecting said opposing vertical members in the respective opposing side frames to form a structurally independent load bearing support system not supported by the side walls of said cargo vehicle for supporting one or more levels of accessories, thereby providing one or more additional levels of load bearing surfaces for said cargo vehicle; and
wherein said load bearing surface is one of the following: a shelf, bench, cot, bucket, bin, drawer, sliding rack, and platform.

43. The kit of claim 42, wherein said members of the support system are manufactured in a predetermined size and are cut accordingly to fit various features and dimensions of said cargo vehicle.

44. The kit of claim 42, wherein said accessory is a load bearing surface, wherein said load bearing surface is connected to one or more said vertical members, and wherein said load bearing surface is held at an angular position, with respect to said vertical member, from about 0 to about 180 degrees.

45. The kit of claim 42, wherein said accessory is a load bearing surface, wherein said load bearing surface has a distal end and a proximal end, wherein said proximal end is connected to one or more said vertical members, and wherein said distal end is at an angle that is lower than said proximal end.

46. The kit of claim 42, wherein said accessory is a load bearing surface, wherein said load bearing surface has a distal end and a proximal end, wherein said proximal end is connected to one or more said vertical members, and wherein said distal end is at an angle that is higher than said proximal end.

47. The kit of claim 42, wherein said at least one transverse member is an adjustable transverse member such that the length of said at least one transverse member is adjustable.

48. The kit of claim 47, wherein said at least one transverse member is a telescopic member comprising an outer member and an inner member, wherein said inner member is insertable into said outer member and moves with respect to said outer member to adjust the length of said at least one transverse member.

49. The kit of claim 42, wherein said each vertical member comprises an adjustable foot for adjusting the height of said each vertical member.

50. The kit of claim 42, wherein each of said at least two opposing side frames have two sides, a first side which faces a cargo wall and a second side which faces the other respective opposing side frame, and wherein said at least two opposing side frames are positioned in a manner such that there is space defined between said first side of each respective side frame and the cargo wall.

51. The kit of claim 50, wherein at least one of said accessories is connected to at least one side of an opposing side frame.

52. The kit of claim 42, wherein said system transfers its weight and the weight of load bearing elements supported by said system to one or more load bearing structures of the cargo vehicle.

53. The kit of claim 42, wherein said kit further comprises instructions for assembling a structurally independent load bearing support system for use in a cargo vehicle.

54. The kit of claim 42, further comprising a cross brace formed of at least two stabilization bar members.

55. The kit 54, wherein said cross brace connects at least two different longitudinally spaced vertical members.

56. The kit of claim 42, further comprising a cross brace formed of at least two transverse members.

57. The kit of claim 56, wherein said cross brace connects said opposing side frames.

58. A structurally independent load bearing support system for use in a cargo vehicle, comprising:
  at least two opposing side frames, each side frame comprising a plurality of longitudinally spaced vertical members, each vertical member connected to another vertical member of the same respective side frame by one or more stabilization bar members to provide stability and alignment of said plurality of longitudinally spaced vertical members; and
  at least one transverse member, said at least one transverse member connects opposing vertical members in the respective opposing side frames to form a structurally independent load bearing support system not supported by the side walls of said cargo vehicle for supporting one or more levels of accessories, thereby providing one or more additional levels of load bearing surfaces for said cargo vehicle; and
  wherein said at least one transverse member is a telescopic member comprising an outer member and an inner member, wherein said inner member is insertable into said outer member and moves with respect to said outer member to adjust the length of said at least one transverse member.

59. The structurally independent load bearing support system of claim 58, wherein said accessory comprises a bracket at the proximal end for connecting said accessory to a vertical member.

60. The structurally independent load bearing support system of claim 58, wherein said accessory comprises a support arm for connecting said accessory to a vertical member.

61. The structurally independent load bearing support system of claim 60, wherein said support arm is a transverse member.

62. The structurally independent load bearing support system of claim 58, wherein said accessory is molded with one or more support arms, wherein each support arm comprises a bracket at the proximal end for connecting said support arm to a vertical member.

63. The structurally independent load bearing support system of claim 58, wherein said accessory is at least one of the following: a shelf, a bench, a cot, a platform, a drawer, a bin, a bucket, a hook, or a rack.

64. The structurally independent load bearing support system of claim 63, wherein said accessory is a shelf, said shelf comprises one or more indentations at its proximal end to receive a bracket, thereby enabling said shelf to be mounted flush against said plurality of longitudinally spaced vertical members.

65. The structurally independent load bearing support system of claim 64, wherein said bracket comprises a U-channel having a face portion and two opposing side portions, each of said two opposing side portion comprises at least one depression to provide at least one depression pair for said bracket; wherein each vertical member comprises a U-channel having a face portion and two opposing side portions, each opposing side portion having a plurality of openings to receive said depression pair to securely attach said shelf to a vertical member.

66. The structurally independent load bearing support system of claim 58, wherein each of said two opposing side portions extends beyond said face portion to enable said shelf to rotate upward to a storage position and rotate downward to an utility position with respect to said depression pair.

67. The structurally independent load bearing support system of claim 64, wherein said bracket comprises a U-channel having a face portion and two opposing side portions, each of said two opposing side portion comprises at least one opening to provide at least one opening pair for said bracket; wherein each vertical member comprises a U-channel having a face portion and two opposing side portions, each opposing side portion having a plurality of openings to provide a plurality of opening pairs; wherein said bracket is connected to said vertical member by axially aligning said at least one opening pair on said bracket to an opening pair on said vertical member and inserting a bolt or pin through said axially aligned opening pairs, thereby transferring the weight of said shelf onto said plurality of longitudinally spaced vertical members.

68. The structurally independent load bearing support system of claim 67, wherein each of said two opposing side portions extends beyond said face portion to enable said shelf to rotate upward to a storage position and rotate downward to an utility position with respect to said bolt.

69. The structurally independent load bearing support system of claim 58, wherein said accessory is a load bearing surface, wherein said load bearing surface is connected to one or more said vertical members, and wherein said load bearing surface is held at an angular position with respect to said vertical member from about 0 to about 180 degrees.

70. The structurally independent load bearing support system of claim 58, wherein said at least one transverse member comprises a bracket at each end for connecting said at least one transverse member to opposing vertical members of the respective opposing side frames.

71. The structurally independent load bearing support system of claim 58, wherein said cargo vehicle has various features and dimensions; and wherein at least one or more of said members of the support system are non-uniform in size or shape to support or accommodate said various features and dimensions of said cargo vehicle.

72. The structurally independent load bearing support system of claim 58, wherein said each vertical member comprises an adjustable foot for adjusting the height of said each vertical member.

73. The structurally independent load bearing support system of claim 72, wherein said adjustable foot includes a floor plate for connecting said support system to the floor of said cargo vehicle.

74. The structurally independent load bearing support system of claim 58, wherein the number of said plurality of longitudinally spaced vertical members and the longitudinal spacing between said each vertical member in each opposing side frame varies with the various features and dimensions of said cargo vehicle.

75. The structurally independent load bearing support system of claim 58, wherein said plurality of longitudinal spaced vertical members and said at least one transverse member are constructed of at least one of the following suitable load bearing material: steel, aluminum, plastic, vinyl, plastic resin, fiberglass, and fiberglass reinforced plywood.

76. The structurally independent load bearing support system of claim 58, wherein said cargo vehicle is one of the following: truck, van, trailer, train, plane and ship.

77. The structurally independent load bearing support system of claim 58, wherein said at least two opposing side frames are mounted flush with the respective walls, floor, and ceiling of the cargo area in order to utilize substantially all of the cargo space of said cargo vehicle, both vertically and horizontally.

78. The structurally independent load bearing support system of claim 58, wherein each of said at least two opposing side frames have two sides, a first side which faces a cargo wall and a second side which faces the other respective opposing side frame, and wherein said at least two opposing side frames are positioned in a manner such that there is space defined between said first side of each respective opposing side frame and the cargo wall.

79. The structurally independent load bearing support system of claim 78, wherein at least one of said accessories is connected to at least one side of an opposing frame.

80. The structurally independent load bearing support system of claim 58, wherein at least one level of accessories comprises a load bearing surface, wherein said load bearing surface is one of the following: a shelf, bench, cot, bucket, bin, drawer, sliding rack, and platform.

81. The structurally independent load bearing support system of claim 58, wherein said system transfers its weight and the weight of load bearing elements supported by said system to one or more load bearing structures of the cargo vehicle.

82. The structurally independent load bearing support system of claim 71, wherein said various features comprises at least one of the following: a door, refrigerator unit, wheel well, fuel port, and window.

83. The structurally independent load bearing support system of claim 58, wherein said members of the support system are manufactured in a predetermined size and are cut accordingly to fit various features and dimensions of said cargo vehicle.

84. The structurally independent load bearing support system of claim 58, wherein at least one accessory is an open bin to display products to customers.

85. The structurally independent load bearing support system of claim 58, further comprising a cross brace formed of at least two stabilization bar members.

86. The structurally independent load bearing support system of claim 85, wherein said cross brace connects at least two different longitudinally spaced vertical members.

87. The structurally independent load bearing support system of claim 58, further comprising a cross brace formed of at least two transverse members.

88. The structurally independent load bearing support system of claim 87, wherein said cross brace connects said opposing side frames.

89. A structurally independent load bearing support system for use in a cargo vehicle manufactured by the process comprising the steps of:
assembling at least two opposing side frames, wherein each side frame comprises a plurality of longitudinally spaced vertical members, by connecting each said vertical member to another vertical member within each respective side frame by one or more stabilization bar members to provide stability and alignment of said plurality of longitudinally spaced vertical members; and
connecting opposing vertical members in the respective opposing side frames by at least one transverse member to form a structurally independent load bearing support system not supported by the side walls of said cargo vehicle for supporting one or more levels of accessories, thereby providing one or more additional levels of load bearing surfaces for said cargo vehicle; and
wherein said at least one transverse member is a telescopic member comprising an outer member and an inner member, wherein said inner member is insertable into said outer member and moves with respect to said outer member to adjust the length of said at least one transverse member.

90. The structurally independent load bearing support system for use in a cargo vehicle manufactured by the process of claim 32, wherein said accessory is at least one of the following: a shelf, a bench, a cot, a platform, a drawer, a bin, bucket, or a rack.

91. The structurally independent load bearing support system for use in a cargo vehicle manufactured by the process of claim 89, wherein said each vertical member comprises an adjustable foot for adjusting the height of said each vertical member.

92. The structurally independent load bearing support system for use in a cargo vehicle manufactured by the process of claim 89, wherein said cargo vehicle is one of the following: truck, van, trailer, train, plane and ship.

93. The structurally independent load bearing support system for use in a cargo vehicle manufactured by the process of claim 89, wherein said at least two opposing side frames are mounted flush with the respective walls, floor, and ceiling of the cargo area in order to utilize substantially all of the cargo space of said cargo vehicle, both vertically and horizontally.

94. The structurally independent load bearing support system for use in a cargo vehicle manufactured by the process of claim 89, wherein each of said at least two opposing side frames have two sides, a first side which faces a cargo wall and a second side which faces the other respective opposing side frame, and wherein said at least two opposing side frames are positioned in a manner such that there is space defined between said first side of each respective side frame and the cargo wall.

95. The structurally independent load bearing support system for use in a cargo vehicle manufactured by the process of claim 94, wherein at least one of said accessories is connected to at least one side of an opposing side frame.

96. The structurally independent load bearing support system for use in a cargo vehicle manufactured by the process of claim 89, wherein said system transfers its weight and the weight of load bearing elements supported by said system to one or more load bearing structures of the cargo vehicle.

97. The structurally independent load bearing support system for use in a cargo vehicle manufactured by the process of claim 89, wherein said members of the support system are manufactured in a predetermined size and are cut accordingly to fit various features and dimensions of said cargo vehicle.

98. A kit for assembling a structurally independent load bearing support system for use in a cargo vehicle, the kit comprising:
- a plurality of load bearing vertical members for forming at least two opposing side frames;
- one or more stabilization bar members for connecting said vertical members of each respective side frame; and
- at least one transverse member for connecting said opposing vertical members in the respective opposing side frames to form a structurally independent load bearing support system not supported by the side walls of said cargo vehicle for supporting one or more levels of accessories, thereby providing one or more additional levels of load bearing surfaces for said cargo vehicle; and
- wherein said at least one transverse member is a telescopic member comprising an outer member and an inner member, wherein said inner member is insertable into said outer member and moves with respect to said outer member to adjust the length of said at least one transverse member.

99. The kit of claim 98, wherein said members of the support system are manufactured in a predetermined size and are cut accordingly to fit various features and dimensions of said cargo vehicle.

100. The kit of claim 98, wherein said accessory is a load bearing surface, wherein said load bearing surface is connected to one or more said vertical members, and wherein said load bearing surface is held at an angular position, with respect to said vertical member, from about 0 to about 180 degrees.

101. The kit of claim 98, wherein said accessory is a load bearing surface, wherein said load bearing surface has a distal end and a proximal end, wherein said proximal end is connected to one or more said vertical members, and wherein said distal end is at an angle that is lower than said proximal end.

102. The kit of claim 98, wherein said accessory is a load bearing surface, wherein said load bearing surface has a distal end and a proximal end, wherein said proximal end is connected to one or more said vertical members, and wherein said distal end is at an angle that is higher than said proximal end.

103. The kit of claim 98, wherein said at least one transverse member is an adjustable transverse member such that the length of said at least one transverse member is adjustable.

104. The kit of claim 98, wherein said accessory is at least one of the following: a shelf, a bench, a cot, a platform, a drawer, a bin, a hook, a bucket, or a rack.

105. The kit of claim 98, wherein said each vertical member comprises an adjustable foot for adjusting the height of said each vertical member.

106. The kit of claim 98, wherein each of said at least two opposing side frames have two sides, a first side which faces a cargo wall and a second side which faces the other respective opposing side frame, and wherein said at least two opposing side frames are positioned in a manner such that there is space defined between said first side of each respective side frame and the cargo wall.

107. The kit of claim 106, wherein at least one of said accessories is connected to at least one side of an opposing side frame.

108. The kit of claim 98, wherein said system transfers its weight and the weight of load bearing elements supported by said system to one or more load bearing structures of the cargo vehicle.

109. The kit of claim 98, wherein said kit further comprises instructions for assembling a structurally independent load bearing support system for use in a cargo vehicle.

110. The kit of claim 98, wherein said load bearing surface is one of the following: a shelf, bench, cot, bucket, bin, drawer, sliding rack, and platform.

111. The kit of claim 98, further comprising a cross brace formed of at least two stabilization bar members.

112. The kit 98, wherein said cross brace connects at least two different longitudinally spaced vertical members.

113. The kit of claim 98, further comprising a cross brace formed of at least two transverse members.

114. The kit of claim 113, wherein said cross brace connects said opposing side frames.

* * * * *